United States Patent
Okamoto et al.

(10) Patent No.: US 7,511,086 B2
(45) Date of Patent: Mar. 31, 2009

(54) THERMOPLASTIC RESIN COMPOSITION, MOLDED PRODUCT THEREFROM AND OUTSIDE PLATE PART FOR VEHICLE USING THE MOLDED PRODUCT

(75) Inventors: Kazuo Okamoto, Hiroshima (JP); Yushi Matsuda, Hiroshima (JP); Yukinori Nakajima, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 507 days.

(21) Appl. No.: 11/294,960

(22) Filed: Dec. 6, 2005

(65) Prior Publication Data

US 2006/0122326 A1    Jun. 8, 2006

(30) Foreign Application Priority Data

Dec. 7, 2004 (JP) ............................ P2004-354403
Mar. 31, 2005 (JP) ............................ P2005-103602
Aug. 31, 2005 (JP) ............................ P2005-251459

(51) Int. Cl.
  *C08L 77/00* (2006.01)
  *C08K 9/10* (2006.01)
  *C03C 25/30* (2006.01)

(52) U.S. Cl. ...................... 523/201; 523/202; 523/206; 523/209; 523/212; 523/216; 524/425; 524/451; 524/514; 525/66; 525/179

(58) Field of Classification Search ................ 523/201, 523/202, 206, 209, 212, 216; 524/425, 451, 524/514; 525/66, 179
See application file for complete search history.

(56) References Cited

U.S. PATENT DOCUMENTS 5,874,176 A    2/1999    Kamei et al.

FOREIGN PATENT DOCUMENTS

| EP | 0 683 210 A2 | 11/1995 |
| JP | 7-316423 | 12/1995 |
| JP | 08-302025 | 11/1996 |
| JP | 11-335553 | 12/1999 |

*Primary Examiner*—Ana L Woodward
(74) *Attorney, Agent, or Firm*—Brooks Kushman P.C.

(57) ABSTRACT

Provided are a thermoplastic resin composition, a thermoplastic resin molded product and an outside plate part of a vehicle capable of improving both characteristics of heat resistance and impact resistance while being compatible with each other. The thermoplastic resin composition contains: 65 to 86.5 mass % of a polyamide resin component (A), 13 to 25 mass % of an acid modified elastomer component (B), and 10 mass % or less of an olefin-based resin component (C) and/or 8 mass % or less of a filler component (D), wherein a dispersion phase of a core-shell type particle structure that is formed from the acid modified elastomer component (B) serving as a shell phase and the olefin-based resin component (C) and/or the filler component (D) serving as a core phase is dispersed in a matrix phase formed from the polyamide resin component (A).

11 Claims, 25 Drawing Sheets

Fig. 18

| | | 1ST COMPONENT | | 2ND COMPONENT | | | 3RD COMPONENT | | | | | EVALUATION RESULT | | | |
|---|---|---|---|---|---|---|---|---|---|---|---|---|---|---|---|
| | | PA | | ELASTOMER | | | OLEFIN RESIN | | | | | IZOD IMPACT RESISTANCE (KJ/m2) | | THERMAL DEFORMATION QUANTITY (mm) | |
| | | KIND | | KIND | | | KIND | | | | | COLD TEMPERATURE | ORDINARY TEMPERATURE | | |
| | | PA9T | PA6T | m-EBR | m-EPR | m-SEBS | PP | m-PP | PE | m-PE | m-EVA | | | | |
| 1 | COMP. EX.1 | O | | O | | | | | | | | 100 | 0 | 3 | 0.5 |
| | COMP. EX.2 | O | | O | | | | | | | | 90 | 10 | 4 | 2.8 |
| | COMP. EX.3 | O | | O | | | | | | | | 87 | 13 | 15 | 2.8 |
| | COMP. EX.4 | O | | O | | | | | | | | 85 | 15 | 45 | 2.5 |
| | COMP. EX.5 | O | | O | | | | | | | | 80 | 20 | 43 | 4.5 |
| | COMP. EX.6 | O | | O | | | | | | | | 75 | 25 | 68 | 5.8 |
| | COMP. EX.7 | O | | O | | | | | | | | 70 | 30 | 94 | 7.0 |
| 2 | COMP. EX.101 | O | | | O | | | | | | | 80 | 20 | 73 | 2.5 |
| 3 | COMP. EX.201 | O | | | | O | | | | | | 80 | 20 | 36 | 5.8 |
| 4 | COMP. EX.301 | | O | O | | | | | | | | 80 | 20 | 18 | 17.0 |
| 5 | COMP. EX.304 | | O | | O | | | | | | | 80 | 20 | 24 | 13.5 |

Fig.19

| | | MIXING COMPONENT RATIO | | | | | | | | | | | EVALUATION RESULT | | |
|---|---|---|---|---|---|---|---|---|---|---|---|---|---|---|---|
| | | 1ST COMPONENT | | 2ND COMPONENT | | | | 3RD COMPONENT | | | | | IZOD IMPACT RESISTANCE (KJ/m2) | | THERMAL DEFORMATION QUANTITY (mm) |
| | | PA | | ELASTOMER | | | | OLEFIN RESIN | | | | | | | |
| | | KIND | | KIND | | | | KIND | | | | | | | |
| | | PA9T | PA6T | m-EBR | m-EPR | m-SEBS | | PP | m-PP | PE | m-PE | m-EVA | COLD TEMPERATURE | ORDINARY TEMPERATURE | |
| | COMP. EX 2 | O | | 90 | O | | 10 | | | | | | | 4 | 2.8 |
| | EXAMPLE 1 | O | | 87.5 | O | | 10 | O | 2.5 | | | | | 8 | 2.3 |
| 1 | EXAMPLE 2 | O | | 85 | O | | 10 | O | 5 | | | | | 8 | 2.8 |
| | EXAMPLE 3 | O | | 82.5 | O | | 10 | O | 7.5 | | | | | 11 | 2.8 |
| | COMP. EX 20 | O | | 80 | O | | 10 | O | 10 | | | | | 8 | 4.3 |
| | COMP. EX 3 | O | | 87 | O | | 13 | | | | | | | 15 | 2.8 |
| | EXAMPLE 4 | O | | 84.5 | O | | 13 | O | 2.5 | | | | | 22 | 2.5 |
| 2 | EXAMPLE 5 | O | | 82 | O | | 13 | O | 5 | | | | | 36 | 2.8 |
| | COMP. EX 21 | O | | 79.5 | O | | 13 | O | 7.5 | | | | | 45 | 4.5 |
| | COMP. EX 22 | O | | 77 | O | | 13 | O | 10 | | | | | 28 | 4.8 |
| | COMP. EX 4 | O | | 85 | O | | 15 | | | | | | | 45 | 2.5 |
| | EXAMPLE 6 | O | | 82.5 | O | | 15 | O | 2.5 | | | | | 68 | 2.3 |
| 3 | EXAMPLE 7 | O | | 80 | O | | 15 | O | 5 | | | | | 58 | 2.0 |
| | COMP. EX 23 | O | | 77.5 | O | | 15 | O | 7.5 | | | | | 84 | 3.3 |
| | COMP. EX 24 | O | | 75 | O | | 15 | O | 10 | | | | | 77 | 2.8 |
| | COMP. EX 5 | O | | 80 | O | | 20 | | | | | | | 43 | 4.5 |
| | EXAMPLE 8 | O | | 77.5 | O | | 20 | O | 2.5 | | | | | 87 | 1.8 |
| 4 | EXAMPLE 9 | O | | 75 | O | | 20 | O | 5 | | | | | 96 | 2.0 |
| | EXAMPLE 10 | O | | 72.5 | O | | 20 | O | 7.5 | | | | | 95 | 2.3 |
| | COMP. EX 25 | O | | 70 | O | | 20 | O | 10 | | | | | 93 | 6.0 |
| | COMP. EX 26 | O | | 67.5 | O | | 20 | O | 12.5 | | | | | 82 | 7.0 |
| | COMP. EX 6 | O | | 75 | O | | 25 | | | | | | | 68 | 5.8 |
| | EXAMPLE 11 | O | | 72.5 | O | | 25 | O | 2.5 | | | | | 100 | 2.8 |
| 5 | COMP. EX 27 | O | | 70 | O | | 25 | O | 5 | | | | | 102 | 6.0 |
| | COMP. EX 28 | O | | 67.5 | O | | 25 | O | 7.5 | | | | | 98 | 8.8 |
| | COMP. EX 29 | O | | 65 | O | | 25 | O | 10 | | | | | 95 | 13.8 |
| | COMP. EX 201 | O | | 80 | | | | | | | O | 20 | | 36 | 5.8 |
| 6 | EXAMPLE 201 | O | | 77.5 | | | | | O | 2.5 | O | 20 | | 42 | 4.0 |
| | EXAMPLE 202 | O | | 75 | | | | | O | 5 | O | 20 | | 51 | 3.0 |
| | COMP. EX 202 | O | | 68 | | | | | O | 12 | O | 20 | | 16 | 49.3 |

Fig.20

| | | MIXING COMPONENT RATIO | | | | | | | | | | | EVALUATION RESULT | | |
|---|---|---|---|---|---|---|---|---|---|---|---|---|---|---|---|
| | | 1ST COMPONENT | | 2ND COMPONENT | | 3RD COMPONENT | | | | | | | IZOD IMPACT RESISTANCE (KJ/m2) | | THERMAL DEFORMATION QUANTITY |
| | | PA | | ELASTOMER | | OLEFIN RESIN | | | | | | | | | |
| | | KIND | | KIND | | KIND | | | | | | | | | |
| | | PA9T | PA6T | m-EBR | m-EPR | m-SEBS | PP | m-PP | PE | m-PE | m-EVA | | COLD TEMPERATURE | ORDINARY TEMPERATURE | (mm) |
| | COMP. EX 5 | O | 80 | O | | | 20 | | | | | | | 43 | | 4.5 |
| | EXAMPLE 21 | O | 77.5 | O | | | 20 | O | | | | | 2.5 | 87 | | 1.8 |
| 1 | EXAMPLE 22 | O | 75 | O | | | 20 | O | | | | | 5 | 96 | | 2.0 |
| | EXAMPLE 23 | O | 72.5 | O | | | 20 | O | | | | | 7.5 | 95 | | 2.3 |
| | COMP. EX 30 | O | 70 | O | | | 20 | O | | | | | 10 | 93 | | 6.0 |
| | COMP. EX 5 | O | 80 | O | | | 20 | | | | | | | 43 | | 4.5 |
| | EXAMPLE 25 | O | 77.5 | O | | | 20 | | O | | | | 2.5 | 85 | | 2.3 |
| 2 | EXAMPLE 26 | O | 75 | O | | | 20 | | O | | | | 5 | 86 | | 3.0 |
| | COMP. EX 31 | O | 72.5 | O | | | 20 | | O | | | | 7.5 | 78 | | 5.8 |
| | COMP. EX 32 | O | 70 | O | | | 20 | | O | | | | 10 | 22 | | 8.5 |
| | COMP. EX 5 | O | 80 | O | | | 20 | | | | | | | 43 | | 4.5 |
| | EXAMPLE 31 | O | 77.5 | O | | | 20 | | | O | | | 2.5 | 70 | | 2.3 |
| 3 | EXAMPLE 32 | O | 75 | O | | | 20 | | | O | | | 5 | 85 | | 2.3 |
| | EXAMPLE 33 | O | 72.5 | O | | | 20 | | | O | | | 7.5 | 50 | | 1.3 |
| | COMP. EX 33 | O | 70 | O | | | 20 | | | O | | | 10 | 27 | | 1.0 |
| | COMP. EX 5 | O | 80 | O | | | 20 | | | | | | | 43 | | 4.5 |
| | EXAMPLE 35 | O | 77.5 | O | | | 20 | | | | O | | 2.5 | 52 | | 3.5 |
| 4 | EXAMPLE 36 | O | 75 | O | | | 20 | | | | O | | 5 | 66 | | 4.0 |
| | EXAMPLE 37 | O | 72.5 | O | | | 20 | | | | O | | 7.5 | 63 | | 4.0 |
| | EXAMPLE 38 | O | 70 | O | | | 20 | | | | O | | 10 | 50 | | 2.8 |
| | COMP. EX 5 | O | 80 | O | | | 20 | | | | | | | 43 | | 4.5 |
| 5 | EXAMPLE 40 | O | 77.5 | O | | | 20 | | | | | O | 2.5 | 72 | | 3.5 |
| | EXAMPLE 41 | O | 75 | O | | | 20 | | | | | O | 5 | 61 | | 3.5 |
| | COMP. EX 40 | O | 68 | O | | | 20 | | | | | O | 12 | 14 | | 5.8 |
| | EXAMPLE 9 | O | 75 | O | | | 20 | O | | | | | 5 | 96 | | 2.0 |
| 6 | EXAMPLE 26 | O | 75 | O | | | 20 | | O | | | | 5 | 86 | | 3.0 |
| | EXAMPLE 32 | O | 75 | O | | | 20 | | | O | | | 5 | 85 | | 2.3 |
| | EXAMPLE 36 | O | 75 | O | | | 20 | | | | O | | 5 | 66 | | 4.0 |
| | COMP. EX 101 | O | 80 | | O | | 20 | | | | | | | 73 | | 2.5 |
| | EXAMPLE 101 | O | 77.5 | | O | | 20 | O | | | | | 2.5 | 79 | | 2.3 |
| 7 | EXAMPLE 102 | O | 75 | | O | | 20 | O | | | | | 5 | 83 | | 1.3 |
| | EXAMPLE 103 | O | 72.5 | | O | | 20 | O | | | | | 7.5 | 84 | | 1.0 |
| | EXAMPLE 104 | O | 70 | | O | | 20 | O | | | | | 10 | 83 | | 2.3 |

Fig. 21

| | 1st Component PA Kind | | 2nd Component Elastomer Kind | | | 3rd Component Olefin Resin Kind | | | | | Izod Impact Resistance (KJ/m²) | | Thermal Deformation Quantity (mm) |
|---|---|---|---|---|---|---|---|---|---|---|---|---|---|
| | PA9T | PA6T | m-EBR | m-EPR | m-SEBS | PP | m-PP | PE | m-PE | m-EVA | Cold Temperature | Ordinary Temperature | |
| COMP. EX 301 | | O 80 | O | | 20 | | | | | | 18 | | 17.0 |
| EXAMPLE 301 | | O 77 | O | | 20 | O | | | | 3 | 83 | | 16.0 |
| EXAMPLE 302 | | O 74 | O | | 20 | O | | | | 6 | 89 | | 11.0 |
| COMP. EX 302 | | O 70 | O | | 20 | O | | | | 10 | 80 | | 18.5 |
| COMP. EX 301 | | O 80 | O | | 20 | | | | | | 18 | | 17.0 |
| EXAMPLE 305 | | O 77 | O | | 20 | | O | | | 3 | 84 | | 14.3 |
| EXAMPLE 306 | | O 74 | O | | 20 | | O | | | 6 | 81 | | 14.8 |
| EXAMPLE 307 | | O 70 | O | | 20 | | O | | | 10 | 31 | | 14.8 |
| COMP. EX 301 | | O 80 | O | | 20 | | | | | | 18 | | 17.0 |
| EXAMPLE 310 | | O 77 | O | | 20 | | | O | | 3 | 83 | | 12.3 |
| EXAMPLE 311 | | O 74 | O | | 20 | | | O | | 6 | 91 | | 16.0 |
| EXAMPLE 312 | | O 70 | O | | 20 | | | O | | 10 | 77 | | 16.8 |
| COMP. EX 301 | | O 80 | O | | 20 | | | | | | 18 | | 17.0 |
| EXAMPLE 315 | | O 77 | O | | 20 | | | | O | 3 | 43 | | 16.3 |
| EXAMPLE 316 | | O 74 | O | | 20 | | | | O | 6 | 57 | | 15.3 |
| COMP. EX 303 | | O 70 | O | | 20 | | | | O | 10 | 38 | | 23.0 |
| COMP. EX 304 | | O 80 | | O | 20 | | | | | | 24 | | 13.5 |
| EXAMPLE 320 | | O 77 | | O | 20 | O | | | | 3 | 63 | | 11.8 |
| EXAMPLE 321 | | O 74 | | O | 20 | O | | | | 6 | 73 | | 11.5 |
| EXAMPLE 322 | | O 70 | | O | 20 | O | | | | 10 | 79 | | 9.0 |

Fig. 22

| | | 1ST COMPONENT | | 2ND COMPONENT | | | 3RD COMPONENT | | | | | | IZOD IMPACT RESISTANCE (KJ/m²) | | THERMAL DEFORMATION QUANTITY (mm) |
|---|---|---|---|---|---|---|---|---|---|---|---|---|---|---|---|
| | | PA | | ELASTOMER | | | OLEFIN RESIN | | | | | | | | |
| | | KIND | | KIND | | | KIND | | | | | | | | |
| | | PA9T | PA6T | m-EBR | m-EPR | m-SEBS | | PP | m-PP | PE | m-PE | m-EVA | | COLD TEMPERATURE | ORDINARY TEMPERATURE | |
| 1 | COMP. EX 5 | O | | O | | | 80 | | | | | | 20 | 43 | | 4.5 |
| 1 | COMP. EX 301 | O | | O | | | 80 | | | | | | 20 | 18 | | 17.0 |
| 1 | EXAMPLE 9 | O | O | O | | | 75 | 20 | O | | | | 5 | 96 | | 2.0 |
| 1 | EXAMPLE 302 | O | O | O | | | 74 | 20 | O | | | | 6 | 89 | | 1.1 |
| 2 | COMP. EX 2 | O | | O | | | 90 | 10 | | | | | | 4 | | 2.8 |
| 2 | COMP. EX 3 | O | | O | | | 87 | 13 | | | | | | 15 | | 2.8 |
| 2 | COMP. EX 4 | O | | O | | | 85 | 15 | | | | | | 45 | | 2.5 |
| 2 | COMP. EX 5 | O | | O | | | 80 | 20 | | | | | | 43 | | 4.5 |
| 2 | COMP. EX 6 | O | | O | | | 75 | 25 | | | | | | 68 | | 5.8 |
| 3 | EXAMPLE 2 | O | | O | | | 85 | 10 | O | | | | 5 | 8 | | 2.8 |
| 3 | EXAMPLE 5 | O | | O | | | 82 | 13 | O | | | | 5 | 36 | | 2.8 |
| 3 | EXAMPLE 7 | O | | O | | | 80 | 15 | O | | | | 5 | 58 | | 2.0 |
| 3 | EXAMPLE 9 | O | | O | | | 75 | 20 | O | | | | 5 | 96 | | 2.0 |
| 3 | EXAMPLE 27 | O | | O | | | 70 | 25 | O | | | | 5 | 102 | | 6.0 |
| 4 | COMP. EX 5 | O | | O | | | 80 | 20 | | | | | | 43 | | 4.5 |
| 4 | EXAMPLE 9 | O | | O | | | 75 | 20 | O | | | | 5 | 96 | | 2.0 |
| 5 | COMP. EX 101 | O | | | O | | 80 | 20 | | | | | | 73 | | 2.5 |
| 5 | EXAMPLE 102 | O | | | O | | 75 | 20 | O | | | | 5 | 83 | | 1.3 |
| 6 | COMP. EX 201 | O | | | | O | 80 | 20 | | | | | | 36 | | 5.8 |
| 6 | EXAMPLE 202 | O | | | | O | 75 | 20 | O | | | | 5 | 51 | | 3.0 |

Fig. 23

| | Name | 1st Component PA Kind PA9T | 1st Component PA Kind PA6T | 2nd Component Elastomer Kind m-EBR | 2nd Component Elastomer Kind m-EPR | 2nd Component Elastomer Kind m-SEBS | 2nd Component Amount | 3rd Component Filler Kind Calcium Carbonate | 3rd Component Filler Kind Talc | 3rd Component Filler Kind Silica | Particle Diameter μm | Pre-kneading | 3rd Component Amount | Izod Impact Resistance (KJ/m²) Cold Temperature | Izod Impact Resistance (KJ/m²) Ordinary Temperature | Thermal Deformation Quantity (mm) |
|---|---|---|---|---|---|---|---|---|---|---|---|---|---|---|---|---|
| 1 | COMP. EX 5 | ○ | | ○ | | | 20 | | | | | | | 43 | | 4.5 |
| 1 | EXAMPLE 500 | ○ | | ○ | | | 20 | ○ | | | 0.1 | YES | 1 | 77 | | 3.3 |
| 1 | EXAMPLE 501 | ○ | | ○ | | | 20 | ○ | | | 0.1 | YES | 2.5 | 77 | | 2.8 |
| 1 | EXAMPLE 502 | ○ | | ○ | | | 20 | ○ | | | 0.1 | YES | 5 | 79 | | 1.5 |
| 1 | EXAMPLE 503 | ○ | | ○ | | | 20 | ○ | | | 0.1 | YES | 8 | 59 | | 3.0 |
| 1 | COMP. EX 500 | ○ | | ○ | | | 20 | ○ | | | 0.1 | YES | 10 | 15 | | 4.3 |
| 1 | COMP. EX 501 | ○ | | ○ | | | 20 | ○ | | | 0.1 | YES | 12 | 30 | | 4.3 |
| 2 | COMP. EX 3 | ○ | | ○ | | | 13 | | | | | | | 15 | | 2.8 |
| 2 | EXAMPLE 505 | ○ | | ○ | | | 13 | ○ | | | 0.1 | YES | 1 | 21 | | 1.8 |
| 2 | EXAMPLE 506 | ○ | | ○ | | | 13 | ○ | | | 0.1 | YES | 2.5 | 17 | | 2.5 |
| 2 | EXAMPLE 507 | ○ | | ○ | | | 13 | ○ | | | 0.1 | YES | 5 | 18 | | 2.5 |
| 3 | COMP. EX 5 | ○ | | ○ | | | 20 | | | | | | | 43 | | 4.5 |
| 3 | COMP. EX 505 | ○ | | ○ | | | 20 | ○ | | | 0.1 | NO | 1 | 43 | | 3.8 |
| 3 | COMP. EX 506 | ○ | | ○ | | | 20 | ○ | | | 0.1 | NO | 2.5 | 43 | | 3.3 |
| 3 | COMP. EX 507 | ○ | | ○ | | | 20 | ○ | | | 0.1 | NO | 5 | 20 | | 3.5 |
| 3 | COMP. EX 508 | ○ | | ○ | | | 20 | ○ | | | 0.1 | NO | 8 | 35 | | 3.3 |
| 3 | COMP. EX 509 | ○ | | ○ | | | 20 | ○ | | | 0.1 | NO | 10 | 16 | | 5.3 |
| 3 | COMP. EX 510 | ○ | | ○ | | | 20 | ○ | | | 0.1 | NO | 12 | 16 | | 6.8 |
| 4 | COMP. EX 3 | ○ | | ○ | | | 13 | | | | | | | 15 | | 2.5 |
| 4 | COMP. EX 511 | ○ | | ○ | | | 13 | ○ | | | 0.1 | NO | 1 | 14 | | 1.8 |
| 4 | COMP. EX 512 | ○ | | ○ | | | 13 | ○ | | | 0.1 | NO | 2.5 | 13 | | 3.0 |
| 4 | COMP. EX 513 | ○ | | ○ | | | 13 | ○ | | | 0.1 | NO | 5 | 9 | | 2.8 |
| 5 | COMP. EX 251 | ○ | | | | ○ | 20 | | | | | | | 36 | | 5.8 |
| 5 | EXAMPLE 801 | ○ | | | | ○ | 20 | ○ | | | 0.1 | YES | 5 | 49 | | 2.3 |
| 5 | COMP. EX 252 | ○ | | | | ○ | 20 | ○ | | | 0.1 | NO | 5 | 14 | | 2.3 |

Fig. 24

| | | 1ST COMPONENT | | 2ND COMPONENT | | | MIXING COMPONENT RATIO 3RD COMPONENT | | | | | | EVALUATION RESULT | | |
|---|---|---|---|---|---|---|---|---|---|---|---|---|---|---|---|
| | | PA | | ELASTOMER | | | FILLER | | | PARTICLE DIAMETER μm | | PRE-KNEADING | | IZOD IMPACT RESISTANCE (KJ/m2) | | THERMAL DEFORMATION QUANTITY (mm) |
| | | KIND | | KIND | | | KIND | | | | | | | COLD TEMPERATURE | ORDINARY TEMPERATURE | |
| | | PA9T | PA6T | m-EBR | m-EPR | m-SEBS | CALCIUM CARBONATE | TALC | SILICA | | | | | | | |
| | COMP. EX 5 | ○ | | ○ | | 20 | | | | | | | | 43 | | 4.5 |
| | COMP. EX 520 | ○ | 75 | ○ | | 20 | ○ | | | | | YES | 5 | 13 | | 0.0 |
| | COMP. EX 521 | ○ | 75 | ○ | | 20 | ○ | | | 0.02 | | YES | 5 | 18 | | 1.3 |
| 1 | EXAMPLE 510 | ○ | 75 | ○ | | 20 | ○ | | | 0.04 | | YES | 5 | 67 | | 2.3 |
| | EXAMPLE 511 | ○ | 75 | ○ | | 20 | ○ | | | 0.08 | | YES | 5 | 79 | | 1.5 |
| | EXAMPLE 512 | ○ | 75 | ○ | | 20 | ○ | | | 0.1 | | YES | 5 | 76 | | 1.5 |
| | EXAMPLE 513 | ○ | 75 | ○ | | 20 | ○ | | | 0.15 | | YES | 5 | 67 | | 2.5 |
| | COMP. EX 522 | ○ | 75 | ○ | | 20 | ○ | | | 0.7 | | YES | 5 | 21 | | 1.0 |
| | COMP. EX 523 | ○ | 75 | ○ | | 20 | ○ | | | 1 | | YES | 5 | 16 | | 1.3 |
| | COMP. EX 524 | ○ | 75 | ○ | | 20 | ○ | | | 3 | | YES | 5 | 12 | | 1.3 |
| | COMP. EX 533 | ○ | 75 | ○ | | 20 | ○ | | | 6 | | YES | 5 | 10 | | 0.3 |
| | COMP. EX 525 | ○ | 75 | ○ | | 20 | ○ | | | 0.02 | | NO | 5 | 11 | | 1.5 |
| | COMP. EX 526 | ○ | 75 | ○ | | 20 | ○ | | | 0.04 | | NO | 5 | 18 | | 2.3 |
| | COMP. EX 527 | ○ | 75 | ○ | | 20 | ○ | | | 0.08 | | NO | 5 | 20 | | 3.5 |
| 2 | COMP. EX 528 | ○ | 75 | ○ | | 20 | ○ | | | 0.1 | | NO | 5 | 20 | | 2.5 |
| | COMP. EX 529 | ○ | 75 | ○ | | 20 | ○ | | | 0.15 | | NO | 5 | 19 | | 2.5 |
| | COMP. EX 530 | ○ | 75 | ○ | | 20 | ○ | | | 0.7 | | NO | 5 | 15 | | 1.0 |
| | COMP. EX 531 | ○ | 75 | ○ | | 20 | ○ | | | 3 | | NO | 5 | 14 | | 1.5 |
| | COMP. EX 532 | ○ | 75 | ○ | | 20 | ○ | | | 6 | | NO | 5 | 13 | | 1.5 |

Fig.25

| | 1ST COMPONENT PA KIND | | | 2ND COMPONENT ELASTOMER KIND | | | | 3RD COMPONENT FILLER KIND | | | PARTICLE DIAMETER μm | PRE-KNEADING | | IZOD IMPACT RESISTANCE (KJ/m2) COLD TEMPERATURE | IZOD IMPACT RESISTANCE (KJ/m2) ORDINARY TEMPERATURE | THERMAL DEFORMATION QUANTITY (mm) |
|---|---|---|---|---|---|---|---|---|---|---|---|---|---|---|---|---|
| | PA9T | PA6T | | m-EBR | m-EPR | m-SEBS | | CALCIUM CARBONATE | TALC | SILICA | | | | | | |
| COMP. EX 5 | O | | 80 | O | | | 20 | | | | | | | 43 | | 4.5 |
| EXAMPLE 500 | O | | 79 | O | | | 20 | O | | | 0.1 | YES | 1 | 77 | | 3.3 |
| EXAMPLE 501 | O | | 78 | O | | | 20 | O | | | 0.1 | YES | 2.5 | 77 | | 2.8 |
| EXAMPLE 502 | O | | 75 | O | | | 20 | O | | | 0.1 | YES | 5 | 79 | | 1.5 |
| COMP. EX 505 | O | | 79 | O | | | 20 | O | | | 0.1 | NO | 1 | 43 | | 3.8 |
| COMP. EX 506 | O | | 78 | O | | | 20 | O | | | 0.1 | NO | 2.5 | 43 | | 3.3 |
| COMP. EX 507 | O | | 75 | O | | | 20 | O | | | 0.1 | NO | 5 | 20 | | 3.5 |
| COMP. EX 5 | O | | 80 | O | | | 20 | | | | | | | 43 | | 4.5 |
| EXAMPLE 550 | O | | 79 | O | | | 20 | | O | | 0.5 | YES | 1 | 82 | | 1.0 |
| EXAMPLE 551 | O | | 78 | O | | | 20 | | O | | 0.5 | YES | 2.5 | 81 | | 1.0 |
| COMP. EX 550 | O | | 75 | O | | | 20 | | O | | 0.5 | YES | 5 | 20 | | 0.8 |
| COMP. EX 551 | O | | 79 | O | | | 20 | | O | | 0.5 | NO | 1 | 25 | | 3.0 |
| COMP. EX 552 | O | | 78 | O | | | 20 | | O | | 0.5 | NO | 2.5 | 23 | | 1.0 |
| COMP. EX 553 | O | | 75 | O | | | 20 | | O | | 0.5 | NO | 5 | 18 | | 1.0 |
| COMP. EX 5 | O | | 80 | O | | | 20 | | | | | | | 43 | | 4.5 |
| EXAMPLE 560 | O | | 75 | O | | | 20 | | | O | 0.15 | YES | 5 | 45 | | 3.8 |
| COMP. EX 560 | O | | 75 | O | | | 20 | | | O | 0.15 | NO | 5 | 19 | | 3.8 |

Fig.26

| | 1ST COMPONENT | | 2ND COMPONENT | | | | 3RD COMPONENT | | | | | EVALUATION RESULT | | |
|---|---|---|---|---|---|---|---|---|---|---|---|---|---|---|
| | PA KIND | | ELASTOMER KIND | | | QUANTITY | FILLER KIND | | | PARTICLE DIAMETER μm | PRE-KNEADING | IZOD IMPACT RESISTANCE (KJ/m2) | | THERMAL DEFORMATION QUANTITY (mm) |
| | PA9T | PA6T | m-EBR | m-EPR | m-SEBS | | CALCIUM CARBONATE | TALC | SILICA | | | COLD TEMPERATURE | ORDINARY TEMPERATURE | |
| 1 COMP.EX 3 | O | | O | | | 87 | | | | | | 15 | | 2.8 |
| 1 EXAMPLE 507 | O | | O | | | 82 13 | O | | | 0.1 | YES 5 | 18 | | 2.5 |
| 2 COMP.EX 5 | O | | O | | | 80 | | | | | | 45 | | 2.5 |
| 2 EXAMPLE 502 | O | | O | | | 75 20 | O | | | 0.1 | YES 5 | 79 | | 1.5 |
| 3 COMP.EX 5 | O | | O | | | 80 20 | | | | | | 43 | | 4.5 |
| 3 EXAMPLE 512 | O | | | | | 75 20 | O | | | 0.15 | YES 5 | 79 | | 1.5 |
| 4 COMP.EX 201 | O | | | | O | 80 20 | | | | | | 36 | | 5.8 |
| 4 EXAMPLE 701 | O | | | | O | 75 20 | O | | | 0.15 | YES 5 | 49 | | 2.3 |

Fig. 27

| | 1ST COMPO-NENT | | 2ND COMPO-NENT | | | 3RD COMPONENT | | | | | EVALUATION RESULT | | |
|---|---|---|---|---|---|---|---|---|---|---|---|---|---|
| | PA | | ELASTOMER | | | FILLER | | | PARTICLE DIAMETER μm | PRE-KNEADING | IZOD IMPACT RESISTANCE (KJ/m2) | | THERMAL DEFORMATION QUANTITY (mm) |
| | KIND | | KIND | | | KIND | | | | | COLD TEMPER-ATURE | ORDINARY TEMPER-ATURE | |
| | PA9T | PA6T | m-EBR | m-EPR | m-SEBS | CALCIUM CARBONATE | TALC | SILICA | | | | | |
| COMP. EX 561 | O | 70 | O | | | O | | | 0.1 | NO | 27 | 5 | 4.0 |
| EXAMPLE 561 | O | 70 | O | | | O | | | 0.1 | YES | 71 | 5 | 3.5 |

Fig. 28

| | 1ST COMPONENT | | | 2ND COMPONENT | | | | 3RD COMPONENT | | | | | | 4TH COMPONENT | EVALUATION RESULT | | | | |
|---|---|---|---|---|---|---|---|---|---|---|---|---|---|---|---|---|---|---|---|
| | PA | | | ELASTOMER | | | | OLEFIN RESIN | | | | | | | IZOD IMPACT RESISTANCE (KJ/m2) | | THERMAL DEFORMATION QUANTITY (mm) | COAT ADHERENCE |
| | KIND | | | KIND | | | | KIND | | | | | | CARBON BLACK | COLD TEMPER-ATURE | ORDINARY TEMPER-ATURE | | | |
| | PA9T | PA6T | | m-EBR | m-EPR | m-SEBS | | PP | m-PP | PE | m-PE | m-EVA | | | | | | | |
| COMP. EX 51 | ○ | | 77.5 | ○ | | | 20 | | | | | | | 2.5 | | 41 | 2.4 | × |
| COMP. EX 52 | ○ | | 82.5 | ○ | | | 15 | | | | | | | 2.5 | | 34 | 2.2 | × |
| COMP. EX 53 | ○ | | 84.5 | ○ | | | 13 | | | | | | | 2.5 | | 33 | 2.2 | × |
| COMP. EX 251 | ○ | | 77.5 | | | ○ | 20 | | | | | | | 2.5 | | 21 | 2.0 | × |

Fig. 29

| | | 1ST COMPONENT PA | | 2ND COMPONENT ELASTOMER | | | | 3RD COMPONENT OLEFIN RESIN | | | | | | | 4TH COMPONENT | EVALUATION RESULT | | | |
|---|---|---|---|---|---|---|---|---|---|---|---|---|---|---|---|---|---|---|---|
| | | KIND | | | KIND | | | | KIND | | | | | MELTING TEMPERATURE | QUANTITY | CARBON BLACK | IZOD IMPACT RESISTANCE (KJ/m²) | | THERMAL DEFORMATION QUANTITY (mm) | COAT ADHERENCE |
| | | PA9T | PA6T | | m-EBR | m-EPR | m-SEBS | | PP | m-PP | PE | m-PE | m-EVA | | | | COLD TEMP. | ORDINARY TEMP. | | |
| 1 | COMP.EX 51 | O | | 77.5 | O | | | 20 | | | | | | | | | 2.5 | | 41 | 2.4 | × |
| | EXAMPLE 51 | O | | 76.5 | O | | | 20 | | | | O | | | 130 | 1 | 2.5 | | 48 | 1.3 | O |
| | EXAMPLE 52 | O | | 75 | O | | | 20 | | | | O | | | 130 | 2.5 | 2.5 | | 49 | 1.3 | O |
| | EXAMPLE 53 | O | | 72.5 | O | | | 20 | | | | O | | | 130 | 5 | 2.5 | | 50 | 0.8 | O |
| | EXAMPLE 54 | O | | 70 | O | | | 20 | | | | O | | | 130 | 7.5 | 2.5 | | 52 | 0.3 | O |
| | EXAMPLE 55 | O | | 67.5 | O | | | 20 | | | | O | | | 130 | 10 | 2.5 | | 49 | 0.5 | O |
| | COMP.EX 60 | O | | 62.5 | O | | | 20 | | | | O | | | 130 | 15 | 2.5 | | 32 | 2.0 | × |
| | COMP.EX 61 | O | | 57.5 | O | | | 20 | | | | O | | | 130 | 20 | 2.5 | | 13 | 4.8 | × |
| | COMP.EX 62 | O | | 52.5 | O | | | 20 | | | | O | | | 130 | 25 | 2.5 | | 9 | 9.8 | × |
| 2 | COMP.EX 52 | O | | 82.5 | O | | | 15 | | | | | | | | | 2.5 | | 34 | 2.4 | × |
| | EXAMPLE 56 | O | | 77.5 | O | | | 15 | | | | O | | | 130 | 5 | 2.5 | | 42 | 2.0 | O |
| 3 | COMP.EX 53 | O | | 84.5 | O | | | 13 | | | | | | | | | 2.5 | | 33 | 2.2 | × |
| | EXAMPLE 57 | O | | 79.5 | O | | | 13 | | | | O | | | 130 | 5 | 2.5 | | 42 | 2.0 | O |
| 4 | COMP.EX 51 | O | | 77.5 | O | | | 20 | | | | | | | | | 2.5 | | 41 | 2.4 | × |
| | EXAMPLE 60 | O | | 72.5 | O | | | 20 | O | | | | | | 175 | 5 | 2.5 | | 61 | 1.8 | O |
| | EXAMPLE 61 | O | | 67.5 | O | | | 20 | O | | | | | | 175 | 10 | 2.5 | | 55 | 2.4 | O |
| | EXAMPLE 62 | O | | 77.5 | O | | | 15 | O | | | | | | 175 | 10 | 2.5 | | 47 | 1.0 | O |
| | EXAMPLE 63 | O | | 72.5 | O | | | 15 | O | | | | | | 175 | 13 | 2.5 | | 51 | 2.3 | O |
| | COMP.EX 70 | O | | 72.5 | O | | | 12.5 | O | | | | | | 175 | 15 | 2.5 | | 18 | 4.5 | × |
| | COMP.EX 71 | O | | 72.5 | O | | | 10 | O | | | | | | 175 | 15 | 2.5 | | 10 | 6.0 | × |
| 5 | COMP.EX 51 | O | | 77.5 | O | | | 20 | | | | | | | | | 2.5 | | 41 | 2.4 | × |
| | EXAMPLE 75 | O | | 72.5 | O | | | 20 | | | | O | | | 175 | 5 | 2.5 | | 48 | 0.8 | O |
| | EXAMPLE 76 | O | | 72.5 | O | | | 20 | | | | O | | | 130 | 5 | 2.5 | | 44 | 0.3 | × |
| 6 | COMP.EX 51 | O | | 77.5 | O | | | 20 | | | | | | | | | 2.5 | | 41 | 2.4 | × |
| | EXAMPLE 80 | O | | 72.5 | O | | | 20 | | | | | | O | 98 | 5 | 2.5 | | 48 | 2.0 | O |
| 7 | COMP.EX 251 | O | | 77.5 | | | O | 20 | | | | | | | | | 2.5 | | 21 | 2.0 | × |
| | EXAMPLE 203 | O | | 72.5 | | | O | 20 | O | | | | | | 175 | 5 | 2.5 | | 40 | 1.8 | × |

Fig. 30

| | 1ST COMPONENT | | 2ND COMPONENT | | | | 3RD COMPONENT | | | | | 4TH COMPONENT | EVALUATION RESULT | | | |
|---|---|---|---|---|---|---|---|---|---|---|---|---|---|---|---|---|
| | PA | | ELASTOMER | | | | FILLER | | | | | CARBON BLACK | IZOD IMPACT RESISTANCE (KJ/m2) | | THERMAL DEFORMATION QUANTITY (mm) | COAT ADHERENCE |
| | | KIND | | KIND | | | | KIND | | PARTICLE DIAMETER μm | PRE-KNEADING | | COLD TEMPER-ATURE | ORDINARY TEMPER-ATURE | | |
| | | PA9T | PA6T | | m-EBR | m-EPR | m-SEBS | CALCIUM CARBONATE | TALC | SILICA | | | | | | | |
| COMP. EX 51 | 80 | ○ | | | ○ | | | | | | | | 2.5 | | 41 | 2.4 | × |
| EXAMPLE 600 | 73 | ○ | | 20 | ○ | | | ○ | | | 0.15 | YES | 2.5 | | 65 | 2.0 | ○ |
| COMP. EX 51 | 78 | ○ | | 20 | ○ | | | | | | | | 2.5 | | 41 | 2.4 | × |
| EXAMPLE 650 | 73 | ○ | | 20 | ○ | | | | ○ | | 0.5 | YES | 2.5 | | 50 | 1.3 | ○ |
| COMP. EX 650 | 73 | ○ | | 20 | ○ | | | | ○ | | 0.5 | NO | 2.5 | | 21 | 1.8 | ○ |

Fig. 31A

| | | | 1ST COMPONENT | 2ND COMPONENT | | | 3RD COMPONENT | | | | | 3RD COMPONENT | | | | | 4TH COMPONENT | EVALUATION RESULT | | | |
|---|---|---|---|---|---|---|---|---|---|---|---|---|---|---|---|---|---|---|---|---|---|
| | | | PA | ELASTOMER | | | OLEFIN RESIN | | | | MELTING TEMPERATURE | FILLER | | | PARTICLE DIAMETER μm | PRE-KNEADING | CARBON BLACK | IZOD IMPACT RESISTANCE (KJ/m²) | | THERMAL DEFORMATION QUANTITY (mm) | COAT ADHERENCE |
| | | | KIND | KIND | | | KIND | | | | | KIND | | | | | | COLD TEMPERATURE | ORDINARY TEMPERATURE | | |
| | | | PA9T / PA6T | m-EBR | m-EPR | m-SEBS | PP | m-PP | PE | m-PE | m-EVA | | CALCIUM CARBONATE | TALC | SILICA | | | | | | | |
| 1 | COMP. EX 52 | | ○ 83 | ○ | | | | | | | | | | | | | | | 2.5 | | 34 | 2.4 | × |
| | EXAMPLE 901 | | ○ 78 | ○ | | | 15 | | | ○ | | | 130 | 2.5 | ○ | | | 0.15 | YES 2.5 | 2.5 | 43 | 1.5 | ○ |
| | EXAMPLE 902 | | ○ 75 | ○ | | | 15 | | | ○ | | | 130 | 2.5 | ○ | | | 0.15 | YES 5 | 2.5 | 39 | 2.0 | ○ |
| | EXAMPLE 903 | | ○ 73 | ○ | | | 15 | | | ○ | | | 130 | 2.5 | ○ | | | 0.15 | YES 7.5 | 2.5 | 36 | 0.5 | ○ |
| | EXAMPLE 904 | | ○ 75 | ○ | | | 15 | | | ○ | | | 130 | 5 | ○ | | | 0.15 | YES 2.5 | 2.5 | 50 | 2.1 | ○ |
| | EXAMPLE 905 | | ○ 73 | ○ | | | 15 | | | ○ | | | 130 | 5 | ○ | | | 0.15 | YES 5 | 2.5 | 38 | 1.3 | ○ |
| | EXAMPLE 906 | | ○ 73 | ○ | | | 15 | | | ○ | | | 130 | 7.5 | ○ | | | 0.15 | YES 2.5 | 2.5 | 44 | 1.3 | ○ |
| | EXAMPLE 907 | | ○ 68 | ○ | | | 15 | | | ○ | | | 130 | 7.5 | ○ | | | 0.15 | YES 7.5 | 2.5 | 35 | 0.5 | ○ |
| | COMP. EX 901 | | ○ 63 | ○ | | | 15 | | | ○ | | | 130 | 10 | ○ | | | 0.15 | YES 10 | 2.5 | 27 | 1.8 | ○ |
| | COMP. EX 902 | | ○ 59 | ○ | | | 15 | | | ○ | | | 130 | 12 | ○ | | | 0.15 | YES 12 | 2.5 | 20 | 2.5 | ○ |
| 2 | COMP. EX 51 | | ○ 78 | ○ | | | 20 | | | ○ | | | | | | | | | | | 41 | 2.4 | × |
| | EXAMPLE 910 | | ○ 73 | ○ | | | 20 | | | ○ | | | 130 | 2.5 | ○ | | | 0.15 | YES 2.5 | 2.5 | 48 | 1.0 | ○ |
| | EXAMPLE 911 | | ○ 68 | ○ | | | 20 | | | ○ | | | 130 | 2.5 | ○ | | | 0.15 | YES 5 | 2.5 | 50 | 0.8 | ○ |
| | EXAMPLE 912 | | ○ 68 | ○ | | | 20 | | | ○ | | | 130 | 7.5 | ○ | | | 0.15 | YES 2.5 | 2.5 | 47 | 1.5 | ○ |
| | EXAMPLE 913 | | ○ 63 | ○ | | | 20 | | | ○ | | | 130 | 7.5 | ○ | | | 0.15 | YES 7.5 | 2.5 | 47 | 2.0 | ○ |
| | COMP. EX 905 | | ○ 58 | ○ | | | 20 | | | ○ | | | 130 | 10 | ○ | | | 0.15 | YES 10 | 2.5 | 37 | 2.5 | ○ |
| | COMP. EX 906 | | ○ 54 | ○ | | | 20 | | | ○ | | | 130 | 12 | ○ | | | 0.15 | YES 12 | 2.5 | 27 | 2.8 | ○ |

Fig. 31B

| | | | 1ST COMPO-NENT | | 2ND COMPO-NENT | | | 3RD COMPONENT | | | | | | | | | 4TH COMPO-NENT | EVALUATION RESULT | | | |
|---|---|---|---|---|---|---|---|---|---|---|---|---|---|---|---|---|---|---|---|---|---|
| | | | PA | | ELASTOMER | | | OLEFIN RESIN | | | | | FILLER | | | | CARBON BLACK | IZOD IMPACT RESISTANCE (KJ/m²) | | THERMAL DEFORMATION QUANTITY (mm) | COAT ADHERENCE |
| | | | KIND | | KIND | | | KIND | | | | MELTING TEMPERATURE | KIND | | | PARTICLE DIAMETER μm | PRE-KNEADING | | | | |
| | | | PA9T | PA6T | m-EBR | m-EPR | m-SEBS | PP | m-PP | PE | m-PE | m-EVA | | CAL-CIUM CAR-BONATE | TALC | SILICA | | | COLD TEMPERATURE | ORDINARY TEMPERATURE | | |
| 3 | COMP. EX 52 | | O | 83 | O | | 15 | | | O | | | 130 | 5 | | | 0.08 | YES 2.5 | 2.5 | | 34 | 2.4 | × |
| | EXAMPLE 920 | | O | 75 | O | | 15 | | | O | | | 130 | 5 | O | | 0.10 | YES 2.5 | 2.5 | | 36 | 2.0 | O |
| | EXAMPLE 921 | | O | 75 | O | | 15 | | | O | | | 130 | 5 | O | | | YES 2.5 | 2.5 | | 34 | 2.0 | O |
| 4 | COMP. EX 51 | | O | 78 | O | | 20 | O | | | | | 175 | 5 | | | 0.15 | YES 5 | 2.5 | | 41 | 2.4 | × |
| | EXAMPLE 930 | | O | 68 | O | | 20 | O | | | | | 175 | 5 | O | | 0.15 | YES 5 | 2.5 | | 54 | 0.3 | O |
| | COMP. EX 52 | | O | 83 | O | | 15 | | | | | | | | | | | | 2.5 | | 34 | 2.4 | × |
| | EXAMPLE 931 | | O | 73 | O | | 15 | O | | | | | 175 | 5 | O | | 0.15 | YES 2.5 | 2.5 | | 41 | 0.8 | O |
| 5 | COMP. EX 52 | | O | 83 | O | | 15 | | | | | | | | | | | | 2.5 | | 34 | 2.4 | × |
| | EXAMPLE 940 | | O | 73 | O | | 15 | O | | | | O | 98 | 7.5 | | | | | 2.5 | | 42 | 2.0 | O |
| | COMP. EX 51 | | O | 78 | O | | 20 | O | | | | | 175 | 5 | | | | | 2.5 | | 41 | 2.4 | × |
| 6 | COMP. EX 907 | | O | 53 | O | | 20 | O | | | | | 175 | 9 | | O | 0.5 | NO 20 | 2.5 | | 11 | 2.5 | × |
| | COMP. EX 908 | | O | 64 | O | | 20 | O | | | | | 175 | 3 | | O | 0.5 | NO 5 | 2.5 | | 16 | 5.5 | O |
| | COMP. EX 909 | | O | 80 | O | | 10 | O | | | | | 175 | 5 | | O | 0.5 | NO 5 | 2.5 | | 8 | 2.3 | × |
| | COMP. EX 52 | | O | 83 | O | | 15 | | | | | | | | | | | | 2.5 | | 34 | 2.4 | × |
| | EXAMPLE 950 | | O | 75 | O | | 15 | O | | | | | 175 | 5 | | O | 0.5 | YES 2.5 | 2.5 | | 42 | 1.8 | O |
| | EXAMPLE 951 | | O | 70 | O | | 15 | O | | | | | 175 | 5 | | O | 0.5 | YES 7.5 | 2.5 | | 45 | 2.3 | O |

THERMOPLASTIC RESIN COMPOSITION, MOLDED PRODUCT THEREFROM AND OUTSIDE PLATE PART FOR VEHICLE USING THE MOLDED PRODUCT

BACKGROUND OF THE INVENTION

1. Field of the Invention

The invention relates to a thermoplastic resin composition, a thermoplastic resin product molded from the composition and an outside plate part for a vehicle using the thermoplastic resin molded product.

2. Description of the Related Art

Conventionally, consideration has been given to an idea that even outside plate parts including outer panels of a vehicle such as a fender panel and a hood are made of a resin in a series of efforts to achieve more of the light weight in a vehicle such as an automobile and in some of vehicles, resin (resin-made) outside plate parts have been actually used in practical aspects.

In a case where a so-called on-line coating is performed, in which coating on the whole of the body is performed in a coating line in a state of the body into which the outside plate parts of a vehicle such as a fender panel and a hood made from a resin are assembled, a problem has arisen that thermal deformation in the resin outside plate parts occurs with ease by heating in a drying furnace after the coating.

Hence, it has been thought that outside plate parts of a vehicle is molded using a thermoplastic polyamide resin (for example, nylon resin) as a base material, which is a resin material high in heat resistance, that is a resin material comparatively low in thermal deformation caused by heating. On the other hand, since outside plate parts of a vehicle requires impact resistance more than a given level thereof, an elastomer component such as a rubber component high in impact absorption is generally added in order to meet such a requirement (for example, see Japanese Patent Laid-open Publication No. 07-316423 (corresponding to U.S. Pat. No. 5,874, 176) and No. 11-335553). Also, a method is known, in which an elastomer component high in impact absorption is added, and further a filler component is mixed in order to meet the requirement (for example, see Japanese Patent Laid-open Publication No. 07-316423, No. 11-335553 and No. 08-302025).

However, in a case where a polyamide resin is used as a base material to which an elastomer component is added, if one of the both components has, for example as shown in FIG. 15, good characteristics in regard to impact resistance and heat resistance, a characteristic of the other component is lowered, that is there is a so-called a trade-off between the characteristics. That is, if, for example, a mixing quantity of a rubber component (m-EBR) is larger to thereby increase impact resistance, that is if a low temperature IZOD value is larger (see a kinked solid line of FIG. 15), heat resistance decreases while a thermal deformation quantity increases (see the broken kinked line of FIG. 15), and in a case where heat resistance is better and a thermal deformation quantity is less, impact resistance is lower. Therefore, it is a reality that both characteristics are quite difficult being compatible with each other satisfactorily.

In a case where an elastomer component is added and a filler is mixed as well, a polyamide resin in which the filler is mixed is excellent in heat resistance, while on the other hand, a polyamide in which an elastomer component is mixed is excellent in impact resistance, but since heat resistance and impact resistance are in a relationship of a so-called trade-off as described above, it has made difficult being compatible between heat resistance and impact resistance only if both additives are simply mixed into the resin. That is, no composition has been available in which heat resistance and impact resistance are truly compatible with each other by mixing an elastomer component and a filler therein.

Note that outside plate parts of the body such as a fender panel and a hood in the state of an assembled body are, as described above, subjected to coating generally on the whole of the vehicle with a melamine-based paint in on-line coating, followed by heating and drying the body at a baking temperature of the order of about 140° C. in a drying furnace, wherein it is important to outside plate parts made from a resin that a good paint adherence is achieved on surfaces of the outside plate parts (coat adherence) in the series of coating.

SUMMARY OF THE INVENTION

The invention has been made in light of the technical problem and it is a basic object of the invention to provide a thermoplastic resin composition, a thermoplastic resin molded product and an outside plate part of a vehicle, capable of improving both characteristics of heat resistance and impact resistance while being compatible with each other, and further to provide a thermoplastic resin molded product and an outside plate part of a vehicle, good in coat adherence.

The inventors have found while having conducting studies and developments in order to achieve the above object that a matrix phase is formed with polyamide (PA) resin, into which an acid modified elastomer component is mixed as a so-called rubber component with a proper content thereof and further to which an olefin-based (olefin family) resin component and/or a filler is mixed as a third component with a proper content thereof to thereby improve both characteristics of heat resistance and impact resistance in good balance while being compatible with each other.

Note that in the specification, the term "olefin-based resin component and/or a filler" means at least one of "olefin-based resin component and a filler", which is a short way for expression.

The acid modified elastomers that can be preferably used include: modified olefin-based copolymers such as modified ethylene-butene copolymer (m-EBR), modified ethylene-propylene copolymer (m-EPR); modified styrene-based copolymers such as modified styrene-ethylene-butadiene-styrene terpolymer (m-SEBS) and others.

Olefin-based resin components, which is a third component, that can be preferably used include: polypropylene (PP) resin; polyethylene (PE) resin, ethylene-vinyl acetate alcohol (EVA) resin and others, whichever may be modified or unmodified, and fillers that can be preferably used include: calcium carbonate.

It has been found that in a molded product made from the thus obtained composition, a system in the form and of a construction is present that is obtained by dispersing a dispersion phase of a core-shell type particle structure formed with an acid modified elastomer component (rubber component) as a shell phase and an olefin-based resin component and/or a filler as a core phase in a matrix phase formed with a polyamide resin component, in other words a dispersion phase of a so-called "sea-island-lake" type particle structure formed with a polyamide resin component as "sea", a rubber component as "islands" and an olefin-based resin component and/or a filler as "a lake (in an island)". It is considered that such a morphology greatly contributes to improvement of physical properties.

Accordingly, in order to improve both characteristics of heat resistance and impact resistance in good balance while being compatible with each other, it is considered to be important that mixing proportions of an polyamide resin component, an acid modified elastomer and an olefin-based resin component and/or a filler are properly set to realize a morphology in which the core-shell type particle structure is dispersed in the matrix.

Therefore, a thermoplastic resin composition related to a first aspect of the invention (a first invention) contains: 65 to 86.5 mass % of a polyamide resin component (A), 13 to 25 mass % of an acid modified elastomer component (B) and 10 mass % or less of an olefin-based resin component (C) and/or 8 mass % or less of a filler component (D), wherein a dispersion phase of a core-shell type particle structure that is formed from the acid modified elastomer component (B) serving as a shell phase, and the olefin-based resin component (C) and/or the filler component (D) serving as a core phase is dispersed in a matrix phase formed from the polyamide resin component (A).

Why the lower limit of a content of the component (B) is set to 13 mass % is because impact resistance is excessively low if a content of a component (B) is less than this value, while why the upper limit of a content thereof is 25 mass % is because a thermal deformation is excessively large if a content of the component exceeds the value.

Why a content of the component (C) is set to 10 mass % or less (not zero in a case where only a component (C) is mixed without adding a component (D) to a matrix phase) is because it is difficult improving both characteristics of heat resistance and impact resistance while being compatible with each other in a region where a content of the component (C) is exceeds the value.

Why the upper limit of a content of the component (D) is set to 8 mass % is because impact resistance is lowered if a content of the component (D) exceeds the value.

Exemplary polyamide resin components (A) include: Nylon 4, 6, 11, 12, 66, 6T, 9T and 10, MXD 6, polyphthalamide and the like, and in addition, multiple kinds of polyamide resins.

Acid modified elastomer components (B) desirably include: modified olefin-based copolymer s and modified styrene-based copolymers, for example an ethylene-butene copolymer; an ethylene-propylene copolymer; an ethylene-propylene-diene copolymer; a polyethylene oxide copolymer; a styrene-ethylene-butadiene-styrene terpolymer obtained by hydrogenating a styrene-butadiene copolymer; a hydrogenated rubber of a styrene-isoprene copolymer; and a hydrogenated rubber of a copolymer of 1,2-butadiene and 1,4-butadiene, which may be used alone or in combination thereof. An acid modified compound of a maleic acid or the like is preferable among the elastomers.

Exemplary olefin-based resin components (C) include: polymers of aliphatic hydrocarbons such as polyethylene; polypropylene; polybutylene; polybutadiene, ethylene vinyl alcohol; ethylene vinyl acetate alcohol and in addition, acid modified ones thereof.

Exemplary fillers (D) that can be used include: various natural minerals and synthetic materials such as talc, kaolin, bentonite, montmorillonite, calcium carbonate, zinc carbonate, walastonite, alumina, magnesium oxide, calcium silicate, sodium aluminate, sodium aluminosilicate, magnesium silicate, glass balloon, zinc oxide and hydrotalsite.

A filler component (D) is preferably prekneaded into an acid modified elastomer (B) upon mixing the filler component (D). That is, a filler component (D) is desirably prekneaded into an acid modified elastomer component (B) in advance of mixing or kneading the filler component (D) into the polyamide resin component (A). In this case, a step of kneading a component (D) into a component (B) and a step of kneading the mixture into a component (A) are completely separated, and the component (D) is prekneaded into the component (B) as a preceding step of the latter step. Alternatively, in a kneading step into a component (A), a component (B) and a component (D) may be prekneaded in a front section of an extruding feeder. By prekneading in such a way, impact resistance can be greatly improved as compared with a case where no prekneading is conducted.

A second aspect of the invention (a second invention) is characterized in that in the first invention, a content of the acid modified elastomer component (B) is in the range of 15 to 20 mass %.

Why the lower limit value of a content of a component (B) is set to 15 mass % is because a higher impact resistance is obtained with certainty and why the upper limit of a content of a component (B) is set to 20 mass % is because a thermal deformation quantity is suppressed to a small value with certainty.

A third aspect of the invention (a third invention) is characterized in that, in the first or second invention, the acid modified elastomer component (B) is a modified olefin-based copolymer or a modified styrene-based copolymer.

A fourth aspect of the invention (a fourth invention) is characterized in that, in the third invention, the acid modified elastomer component (B) is a modified ethylene-butene copolymer, a modified ethylene-propylene copolymer or a modified styrene-ethylene-butadiene-styrene terpolymer.

A fifth aspect of the invention (a fifth invention) is characterized in that, in the fourth invention, the acid modified elastomer component (B) is the modified ethylene-butene copolymer.

A sixth aspect of the invention (a sixth invention) is characterized in that, in any of the first to the fifth inventions, a lower limit value of a content of the olefin-based resin component (C) is 0.5 mass %.

Why the lower limit value of a content of the component (C) is set to 0.5 mass % is because in a case where the component (C) is added, the practical minimum value that can be added with certainty can be regarded about 0.5 mass % in mixing quantity from the viewpoint of preservation of a weighing precision.

A seventh aspect of the invention (a seventh invention) is characterized in that, in any of the first to the sixth inventions, a lower limit value of a content of the filler component (D) is 0.5 mass %.

Why the lower limit value of a content of the component (D) is set to 0.5 mass % is because in a case where the component (D) is added, the practical minimum value that can be added with certainty can be regarded about 0.5 mass % in mixing quantity from the viewpoint of preservation of a weighing precision.

An eighth aspect of the invention (an eighth invention) is characterized in that, in any of the first to the seventh inventions, the olefin-based resin component (C) is at least one resin selected from the group consisting of polypropylene resin, polyethylene resin and ethylene-vinyl acetate alcohol resin, whichever may be modified or unmodified.

A ninth aspect of the invention (a ninth invention) is characterized in that in any of the first to the eighth inventions, a melting point of the olefin-based resin component (C) is 140° C. or lower.

Why the upper limit value of a melting point of the component (C) is set to 140° C. because in a case where coating is applied on a molded product using the thermoplastic resin component, followed by drying at 140° C., an effect of improvement on coat adherence is difficult to be acquired if a melting point of the component (C) is higher than the drying temperature.

A tenth aspect of the invention (a tenth invention) is characterized in that in any of the first to the ninth inventions, the filler (D) is in the state of particles and an average particle diameter thereof is in the range of 0.08 to 0.7 μm.

Why the filler (D) is constituted of particles and an average particle diameter thereof is set to a value in the range of 0.08 to 0.7 μm is because a better balance can be achieved between heat resistance and impact resistance. Particle diameters of fillers are importantly decreased to a value of submicron or less, whereas if particle diameters of a filler are excessively smaller, aggregation occur among particles. If the average particle diameter is in the range of 0.08 to 0.7 μm, aggregation is suppressed and excellent balance can be realized between heat resistance and impact resistance. A filler with an average particle diameter of the order of submicron also has a merit of easy availability.

An eleventh aspect of the invention (an eleventh invention) is characterized in that, in any of the first to the tenth invention, the filler (D) is selected from a group consisting of calcium carbonate, talc and silica.

In the group, calcium carbonate is most preferable in view point of stability of physical property.

A twelfth aspect of the invention (a twelfth invention) is characterized in that, in any of the first to the eleventh invention, the polyamide resin component (A) is polyamide 9T.

A thermoplastic resin molded product related to a thirteenth aspect of the invention (a thirteenth invention) is characterized in that the thermoplastic resin molded product is molded from the thermoplastic resin composition according to any of the first to twelfth invention.

An outside plate part of a vehicle related to a fourteenth aspect of the invention (a fourteenth invention) is characterized in that the outside plate part is formed from the thermoplastic resin molded product according to the thirteenth invention.

According to the first invention, in addition to proper quantities of a polyamide resin component (A) and an acid modified elastomer (B), proper quantities of an olefin-based resin component (C) and/or a filler (D) are contained as a third component, wherein a dispersion phase of a core-shell type particle structure formed from the component (B) as a shell phase and the component (C) and/or the filler (D) as a core phase is dispersed in the matrix phase formed from the component (A) to thereby enable the improvement of the both characteristics of heat resistance and impact resistance to be improved while being compatible with each other.

According to the second invention, an action and an effect similar to those of the first invention can be basically exerted. Especially, with a content of an acid modified elastomer component (B) in the range of 15 to 20 mass % adopted, both characteristics of heat resistance and impact resistance can be more improved while being more compatible with each other.

According to the third invention, an action and an effect similar to those of the first or second invention can be basically exerted. Especially, with a modified olefin-based copolymer or a modified styrene-based copolymer as the acid modified elastomer component (B) adopted, various kinds of materials that are sold on the market and available to a user with ease can be employed.

According to the fourth invention, with a modified ethylene-butene copolymer (m-EBR), a modified ethylene-propylene copolymer (m-EPR) or a modified styrene-ethylene-butadiene-styrene terpolymer (m-SEBS) as an acid modified elastomer component (B) adopted, various kinds of materials that are sold on the market and available to users with ease can be employed to thereby enable an action and an effect similar to those of any of the first to third inventions to be exerted with certainty.

According to the fifth invention, with a modified ethylene-butene copolymer (m-EBR) as the acid modified elastomer adopted, materials that are widely sold on the market and available to users with ease are employed to thereby enable an action and an effect similar to those of any of the first to third inventions to be exerted with certainty.

According to the sixth invention, an action and an effect similar to those of any of the first to fifth inventions can be basically exerted. Especially, with the lower limit value of the olefin-based resin component (C) of 0.5 mass % in content adopted, a weighting precision can be preserved and certain mixing can be performed even in a case where a quantity of addition is set to the minimum in the sense of practicality.

According to the seventh invention, an action and an effect similar to those of any of the first to sixth inventions can be basically exerted. Especially, with the lower limit of a content of the filler component (D) of 0.5 mass % in content adopted, a weighting precision can be preserved and certain mixing can be performed even in a case where a quantity of addition is set to the minimum in the sense of practicality.

According to the eighth invention, the olefin-based resin component (C) is at least one resin selected from the group consisting of polypropylene (PP) resin, polyethylene (PE) resin, and ethylene-vinyl acetate alcohol (EVA) resin, whichever may be modified or unmodified and thereby, materials that are sold on the market and available to users with ease are employed to enable an action and an effect similar to those of any of the first to seventh inventions to be exerted with certainty.

According to the ninth invention, an action and an effect similar to those of any of the first to eighth inventions can be basically exerted. Especially, with an olefin-based resin component (C) with a melting point of 140° C. or lower adopted, coat adherence can be effectively improved in a case where coating is applied on a molded product made from a thermoplastic resin composition, followed by drying at 140° C.

According to the tenth invention, an action and an effect similar to those of any of the first to ninth inventions can be basically exerted. Especially, with a filler (D) of particles having an average particle diameter in the range of 0.08 to 0.7 μm adopted, a better balance can be realized between heat resistance and impact resistance. That is, particle diameters of fillers are importantly smaller to a value of submicron or less, whereas if particle diameters are extremely smaller, aggregation occurs among particles. However, with an average diameter in the range of 0.08 to 0.7 μm adopted, aggregation is suppressed to thereby enable the improvement of heat resistance and impact resistance in an excellent balance therebetween. A merit can also be achieved that a filler with particle sizes of the order of submicron can be comparatively easily available.

According to the eleventh invention, the filler (D) is selected from a group consisting of calcium carbonate, talc and silica. The materials which are widely sold on the market and available to users with ease are employed to enable an action and an effect similar to those of any of the first to tenth inventions to be exerted with certainty.

According to the twelfth invention, with polyamide 9T (PA9T) as a polyamide component (A) adopted, materials that are widely sold on the market and available to users with ease are employed to enable an action and an effect similar to those of any of the first to eleventh inventions to be exerted with certainty.

According to the thirteenth invention, a thermoplastic resin molded product having an action and an effect similar to those of any of the first to the twelfth inventions can be obtained.

According to the fourteenth invention, an action and an effect similar to those of the thirteenth invention can be exerted and especially, a thermoplastic resin molded product preferable as an outside plate part of a vehicle can be obtained.

BRIEF DESCRIPTION OF THE DRAWINGS

FIG. 18 is a table showing mixing quantities of components and test results in Test I-1 which is a comparative example with no third component mixed therein;

FIG. 19 is a table showing mixing quantities of components and test results in Test I-2 related to an embodiment of the invention;

FIG. 20 is a table showing mixing quantities of components and test results in Test I-3 related to an embodiment of the invention;

FIG. 21 is a table showing mixing quantities of components and test results in Test I-4 related to an embodiment of the invention;

FIG. 22 is a table in which Test I is summarized in a simple way, and that is obtained by compiling some of comparative examples and examples extracted from the tables of FIGS. 19 to 21;

FIG. 23 is a table showing mixing quantities of components and test results in Test II-1 related to an embodiment of the invention;

FIG. 24 is a table showing mixing quantities of components and test results in Test II-2 related to an embodiment of the invention;

FIG. 25 is a table showing mixing quantities of components and test results in Test II-3 related to an embodiment of the invention;

FIG. 26 is a table in which the test II is summarized in a simple way, and that is obtained by compiling some of comparative examples and examples extracted from the tables of FIGS. 23 to 25;

FIG. 27 is a table showing mixing quantities of components and test results in Test II-4 related to an embodiment of the invention;

FIG. 28 is a table showing mixing quantities of components and test results in Test III-1 which is a comparative example with no third component mixed therein;

FIG. 29 is a table showing mixing quantities of respective components and test results in Test III-2 related to an embodiment of the invention;

FIG. 30 is a table showing mixing quantities of respective components and test results in Test III-3 related to an embodiment of the invention;

FIG. 31A is a part of a table showing mixing quantities of respective components and test results in Test III-4 related to an embodiment of the invention; and FIG. 31B is a part of the table showing mixing quantities of respective components and test results in Test III-4 related to an embodiment of the invention.

DESCRIPTION OF THE PREFERRED EMBODIMENTS

Figure 1:
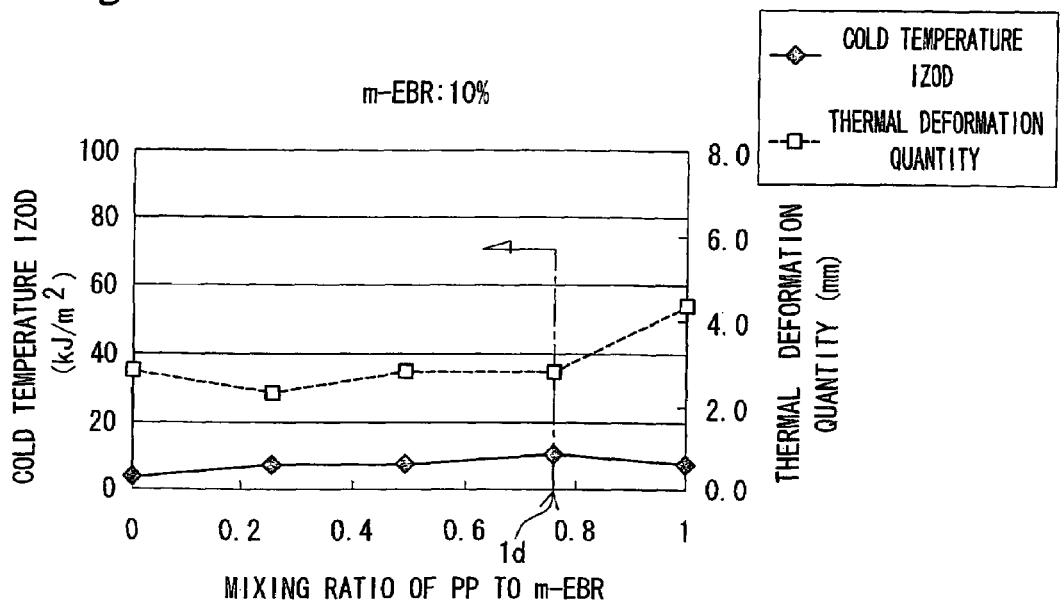
FIG. 1 is a graph showing test results in a case where a mixing quantity of a second component (B) is 10 mass % in Test I-2 related to an embodiment of the invention.

Detailed description will be given of an embodiment of the invention below:

In the embodiment, a polyamide resin component (A) was used as a first component (base component), into which an acid modified elastomer (B) was added as a second component and further to which an olefin-based resin component (C) and/or a filler (D) was added as a third component to thereby basically obtain a thermoplastic resin composition in a three-component system.

To be concrete, first components (A) and second components (B) were selected as follows, to which various third components (C) and/or (D) were combined to obtain various thermoplastic resin compositions.

The first components (A): polyamide resin component
  polyamide 9T (PA9T)
  polyamide 6T (PA6T)

The second components (B) As the acid modified elastomer component were used the following modified olefin-based copolymers or modified styrene-based copolymers.
  modified ethylene-butene copolymer (m-EBR)
  modified ethylene-propylene copolymer (m-EPR)
  modified styrene-ethylene-butadiene-styrene terpolymer (m-SEBS)

The third components (C) As the olefin-based resin components were used the following resins.

polypropylene (PP) resin
polyethylene (PE) resin
modified polypropylene (m-PP) resin
modified polyethylene (m-PE) resin
modified ethylene-vinyl acetate alcohol (m-EVA) resin The third components (D): As the filler components are used the following compound.
calcium carbonate
talc
silica Besides, a mixture of components (C) and (D) was prepared as a third component.

Moreover, another material was prepared, in which carbon black as a fourth component was added into a mixture of a first component, a second component and a third component, thereby secure electric conductance.

The thus obtained thermoplastic composition was molded to obtain a resin molded product to thereby prepare test pieces for a low temperature impact test and a thermal deformation test from kinds of resin molded products.

The cold temperature impact test was performed on test pieces with a thickness of 3.2 mm by means of the IZOD impact test method according to JIS K 7110 and the thermal deformation test was performed on test pieces with a thickness of 3.2 mm by means of a heat sag test method according to JIS K 7195 at a testing temperature of 190° C.

Coat adherence (adhesion strength) was evaluated by means of a coat adherence test according to JIS K 5400 and in a case where a coat separated area is 5% or less, evaluation was good (O) and in a case where the area exceeds 5%, evaluation was bad (X).

Tests were performed according to the following classifications in a broad sense.

Test I: a test in which an olefin-based resin component as a third component is used to find a thermoplastic resin composition that can improve both characteristics of heat resistance and impact resistance while being almost compatible with each other Test II: a test in which a filler is used as a third component (D) to find a thermoplastic resin composition that can improve both characteristics of heat resistance and impact resistance while being almost compatible with each other.

Test III: a test in which various kinds of third components are used to thereby find a thermoplastic resin composition that can not only improve both characteristics of heat resistance and impact resistance while being almost compatible with each other, but also improve coat adherence.

[Test I]

Description will be given firstly of Test I using an olefin-based resin component (C) as a third component.

In Test I, the following were used as the first component, the second component and the third component to prepare test pieces by combining the components in various ways and the tests were performed thereon. Note that in any of cases, a total of a component (A), a component (B) and a component (C) was kept to be 100 mass %.

The first components (A): PA9T and PA6T
The second components (B): m-EBR, m-EPR and m-SEBS
The third components (C): PP, m-PP, PE, m-PE and m-EVA.

Description will be given of test results of various kinds.

<Test I-1>

In Test I-1, test pieces of comparative examples with no third component mixed therein were prepared, on which a low temperature impact test and a thermal deformation test were performed. Test results are shown in a table of FIG. 18.

As understood from the table of FIG. 18, in any of Comparative Examples 1 to 7 in the first row group, the first component (A) was PA9T and the second component (B) was m-EBR in any comparative example, wherein a mixing quantity of the second component (B) changed in the range of 0 to 30 mass %. In Comparative Examples 101 and 201, the first component (A) was PA9T and the second components (B) were m-EPR and m-SEBS. In Comparative Example 301, the first component (A) was PA6T and the second component (B) was m-EBR. In Comparative Example 304, the first component (A) was PA6T and the second component (B) was m-EPR. In any of Comparative Examples 101, 201, 301 and 304, a mixing ratio of the second component was 20 mass %.

Note that in the table of FIG. 18 and those of figures subsequent thereto, a symbol o is placed in each of cells to thereby indicate an actual material in use of the kind of each component, which is one of the first to the fourth components.

Figure 15:
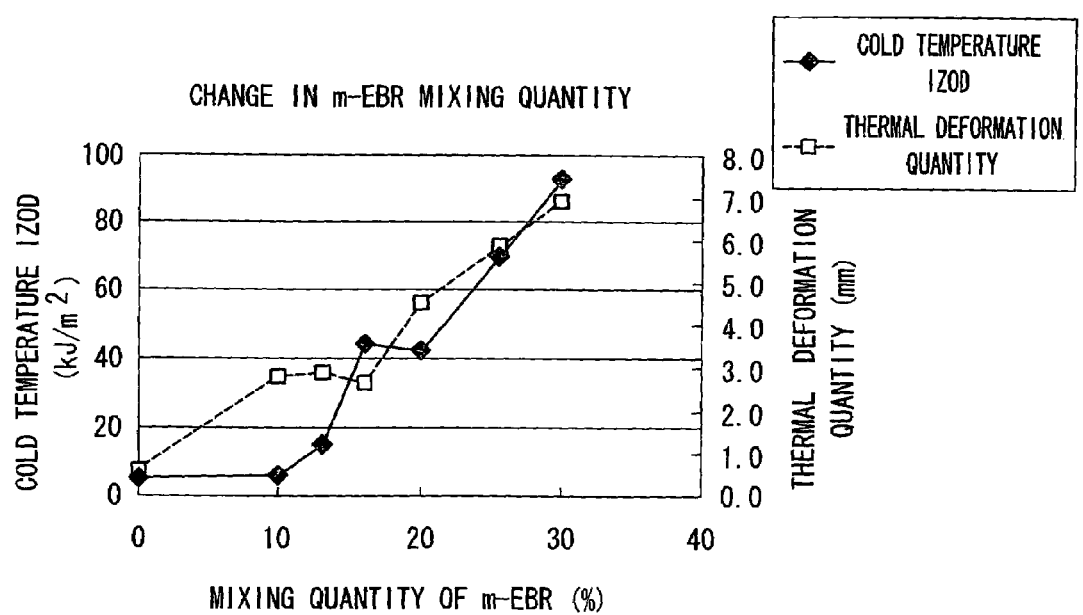
FIG. 15 is a graph showing test results in comparative examples with no third component mixed therein.

Any of comparative examples is a two component system of components (A) and (B) without using a component (C) and test results correspond to those of the graph of FIG. 15. That is, as well understood from the test data in the first row group (Comparative Examples 1 to 7) of FIG. 18 and the graph of FIG. 15, impact resistance (cold temperature IZOD value) and a heat resistance (thermal deformation quantity) are in a relationship of a so-called trade-off.

Note that as seen from test data of Comparative Examples 1 to 7 and the graph of FIG. 15, impact resistance (cold temperature IZOD value) is greatly improved in cases where a mixing ratio of a component (B) is 15 mass % or more, while heat resistance is greatly improved in cases where a mixing ratio of a component (B) is 15 mass % or less.

<Test I-2>

Test I-2 performed on compositions including PA9T as a first component (A) and m-EBR or m-SEBS as a second component and PP as a third component.

In the table of FIG. 19 and the graphs of FIGS. 1 to 5, there are shown mixing quantities of components and test results in Test I-2.

In the first to fifth row group in the table of FIG. 19, in cases where mixing quantities of second components (B) were fixed at specific percentages (10, 13, 15, 20 and 25 mass %) and a mixing quantity of a third component (C) relative to a second component (B) was changed in various ways, there are shown mixing quantities of respective components and test results of comparative examples and examples of thus combined compositions; and FIGS. 1 to 5 correspond to the first to the fifth row groups of FIG. 19.

Description will be given of a case of the first row group and FIG. 1 (a mixing quantity of the second component (B) is 10 mass %) as an example in which in the range where a mixing ratio of a first component (A) relative to a second component (B) was 0.75 (measured point id in Example 3), cold IZOD values (see the kinked solid line of FIG. 1) were equal to or higher, while thermal deformation quantities (see the kinked broken line of FIG. 1) were almost equal to or lower as compared with a case where no third component was added (a mixing ratio was zero in the case of Comparative Example 2). In the region where a mixing ratio of a third component (C) relative to a second component (B) exceeds 0.75 (Comparative Example 20), a thermal deformation quantity is larger than a case where no third component (C) is added.

Therefore, it is understood that in a case where a mixing quantity of a second component (B) is 10 mass %, in the range where a mixing ratio of a third component (C) relative to a second component (B) is 0.75 (that is a mixing quantity is 7.5 mass %) or less (Examples 1 to 3), both characteristics of heat resistance and impact resistance can be improved while being almost compatible with each other as compared with a case where no third component (C) is added.

Figure 9:
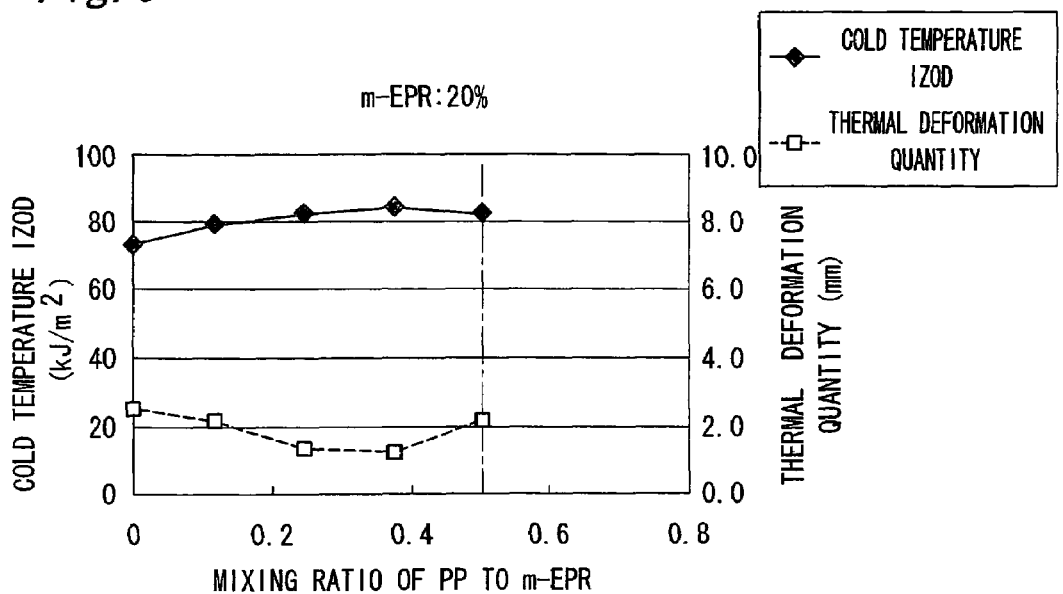
FIG. 9 is a graph showing test results in a case where a second component (B) is m-EPR and a third component (C) is PP resin in Test I-3.

Note that in the table of FIG. 9 and those of the figures subsequent thereto, evaluation results of the examples are made explicit by enclosing with a frame of a heavy line.

In a case where a third component (C) is added, a mixing quantity is only required to be 7.5 mass % or less but not 0 mass %, while since the practical minimum quantity that can be added with certainty is regarded as about 0.5 mass % from the viewpoint preservation of a weighting precision, a mixing quantity of a component (C) necessary for improving both characteristics of heat resistance and impact resistance while being almost compatible with each other is preferably in the range of 0.5 to 7.5 mass %. Therefore, in this case, a thermoplastic resin composition is made from a second component (B) having a mixing quantity of 10 mass %, a third component (C) having a mixing quantity in the range of 0.5 to 7.5 mass % and a first component (A) having a mixing quantity in the range of 89.5 to 82.5 mass %.

Figure 2:
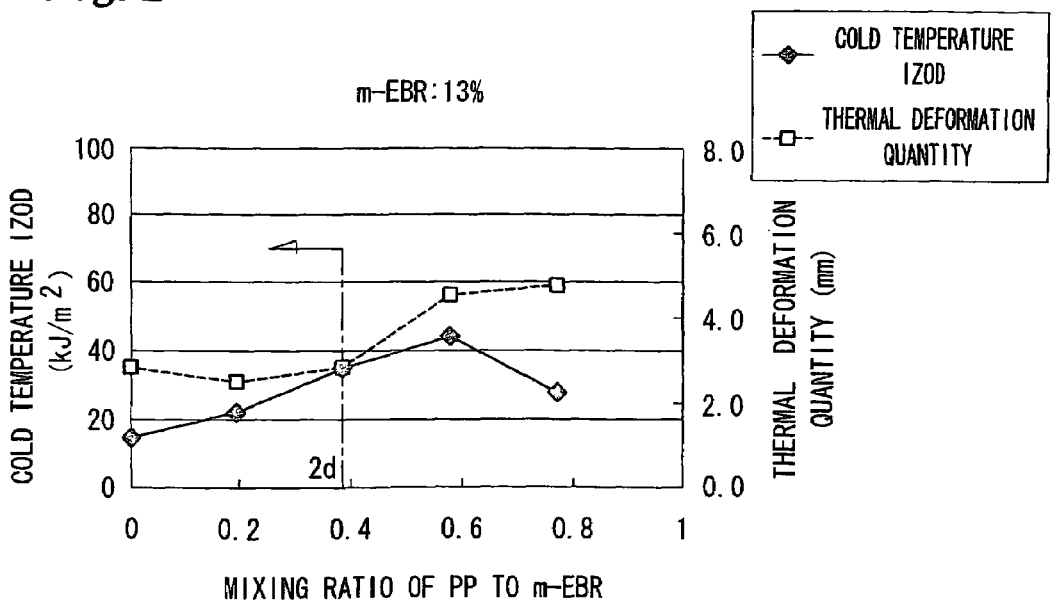
FIG. 2 is a graph showing test results in a case where a mixing quantity of a second component (B) is 13 mass % in Test I-2.

Along a way of thinking similar to that in the above case, in a case of the second row group of FIG. 19 and the graph of FIG. 2 (a mixing quantity of a second component (B) is 13 mass %), a mixing ratio of a third component (C) relative to a second component (B) that can improve both characteristics of heat resistance and impact resistance while being compatible with each other is 0.385 (at a measurement point 2c in Example 5) or less and a mixing quantity of a third component (C) is in the range of 0.5 to 5 mass %. Therefore, a thermoplastic resin composition is constituted of: a second component (B) having a mixing quantity of 13 mass %; a third component (C) having a mixing quantity in the range of 0.5 to 5 mass % and a first component (A) having a mixing quantity in the range of 86.5 to 82 mass %. In the region where the mixing ratio exceeds 0.385 (Comparative Examples 21 and 22), a thermoplastic deformation quantity is larger than in a case where no third component (C) is added.

Figure 3:
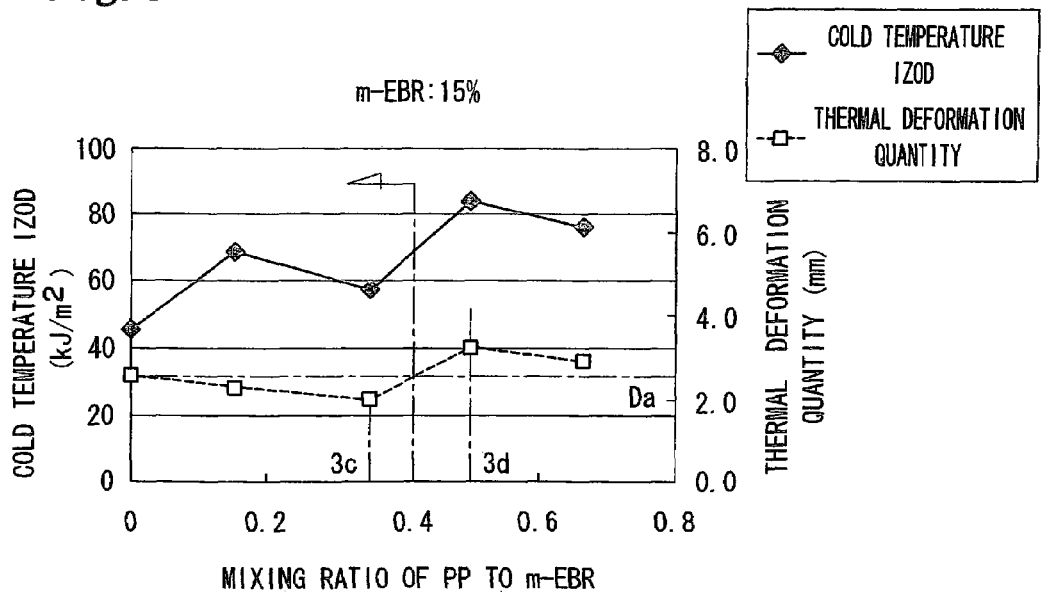
FIG. 3 is a graph showing test results in a case where a mixing quantity of a second component (B) is 15 mass % in Test I-2.

In a case of the third row group of FIG. 19 and the table of FIG. 3 (a mixing quantity of a second component (B) is 15 mass %), a mixing ratio of a third component (C) relative to a second component (B) that can improve both characteristics of heat resistance and impact resistance while being compatible with each other is 0.4 or less and a mixing quantity of a third component (C) is in the range of 0.5 to 6 mass %. Therefore, a thermoplastic resin composition is constituted of: a second component (B) having a mixing quantity of 15 mass %; a third component (C) having a mixing quantity in the range of 0.5 to 6 mass % and a first component (A) having a mixing quantity in the range of 84.5 to 79 mass %. In the region where the mixing ratio exceeds 0.4, a thermoplastic deformation quantity is larger than in a case where no third component (C) is added.

In this case, the upper limit value 0.4 of the mixing ratio was calculated by having obtained a limit value at which a heat resistance was smaller and a thermal resistance was larger than in a case where no third component was added (a mixing ratio was zero).

That is, in a kinked broken line showing measurement results on thermal deformation quantity of the graph of FIG. 3, two adjacent actual measurement points are, to begin with, found out between which a thermal deformation quantity Da (2.5 mm) as a reference at a mixing ratio of 0 (in Comparative Example 4) exists. In the case of the test of FIG. 3, the reference value Da is located between an actual measurement point 3c at a mixing ratio of 0.333 (at a mixing quantity of a third component (C) of 5 mass %, a thermal deformation value is 2.0 mm in Example 7) and the next actual measurement point 3d (at a mixing ratio is 0.5 and a mixing quantity of a third component (C) is 7.5 mass %, a thermal deformation quantity is 3.3 mm in Comparative Example 23). Note that the numerical values at the actual measurement points 3c and 3d are written in the corresponding row group (the third row group).

Conventionally known linear interpolation was applied between the two adjacent actual measurement points 3c and 3d to thereby obtain a mixing quantity of a component (C) corresponding to the reference value Da for a thermal deformation quantity. In this case, the mixing quantity of a third component (C) was obtained by the following calculation.

$$(2.5-2.0) \text{ mm}/(3.3-2.0) \text{ mm} \times (7.5-5.0)\% + 5.0\%$$
$$\approx 5.96\% \approx 6.0\%.$$

Hence, in the example, a mixing quantity of a third component corresponding to a limit value at which a heat resistance is smaller, while a thermal deformation quantity is larger than in a case where no third component (C) is added (a mixing ratio is zero) is about 6.0 mass % and a mixing ratio corresponding thereto is 0.4.

Note that impact resistance (cold IZOD on a kinked solid line of the graph) has no limit value as described above since impact resistance is not lower at any of actually measurement points in a measurement range than in a case where no third component is added (a mixing ratio is zero in Comparative example 4).

Figure 4:
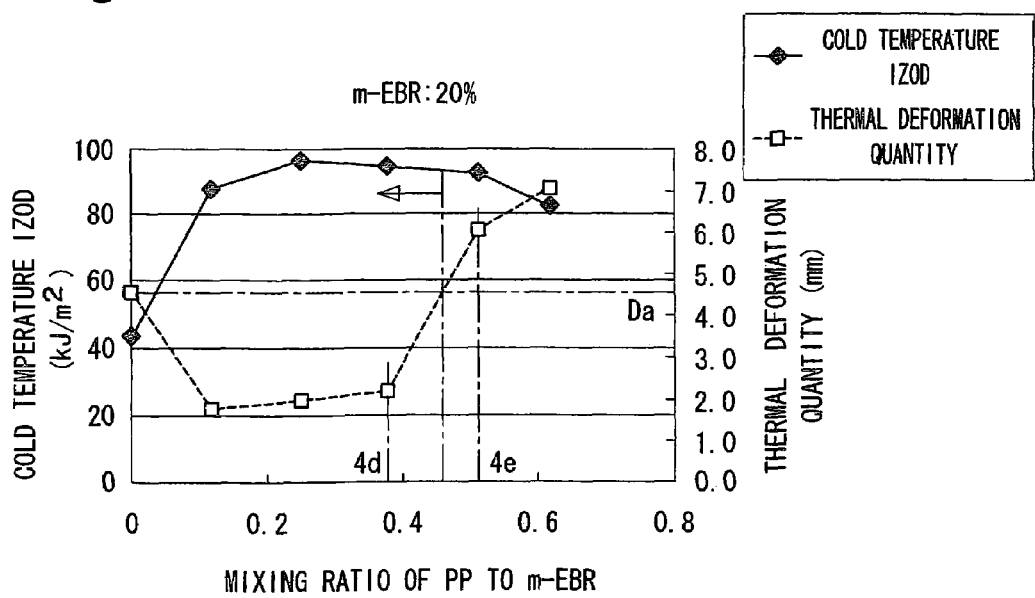
FIG. 4 is a graph showing test results in a case where a mixing quantity of a second component (B) is 20 mass % in Test I-2.

In a case of the fourth row group of FIG. 19 and the table of FIG. 4 (a mixing quantity of a second component is 20 mass %), a mixing ratio of a third component (C) relative to a second component (B) that can improve both characteristics of heat resistance and impact resistance while being compatible with each other is substantially 0.45 or less and a mixing quantity of a third component (C) is in the range of 0.5 to 9 mass % (Examples 8 to 10). Therefore, a thermoplastic resin composition is constituted of: a second component (B) having a mixing quantity of 20 mass %; a third component (C) having a mixing quantity in the range of 0.5 to 9 mass % and a first component (A) having a mixing quantity in the range of 79.5 to 71 mass %. In the region where the mixing ratio exceeds 0.45, a thermoplastic deformation quantity is larger than in a case where no third component (C) is added.

In a case where the test of FIG. 4, since a reference value Da for a thermal deformation quantity is located between an actual measurement point 4d with a mixing ratio of 0.375 (Example 10) and an actual measurement point 4e with a mixing ratio of 0.5 (Comparative Example 25), linear interpolation was applied between the two adjacent actual measurement points 4d and 4e to obtain the upper limit value of a mixing quantity of a third component (C).

Note that in this case as well, no limit value as described above exists since impact resistance (cold IZOD expressed with a kinked solid line in the graph) is not lower at any of actual measurement points in a measurement range than in a case where no third component (C) is added (a mixing ratio is zero in Comparative Example 5).

Figure 5:
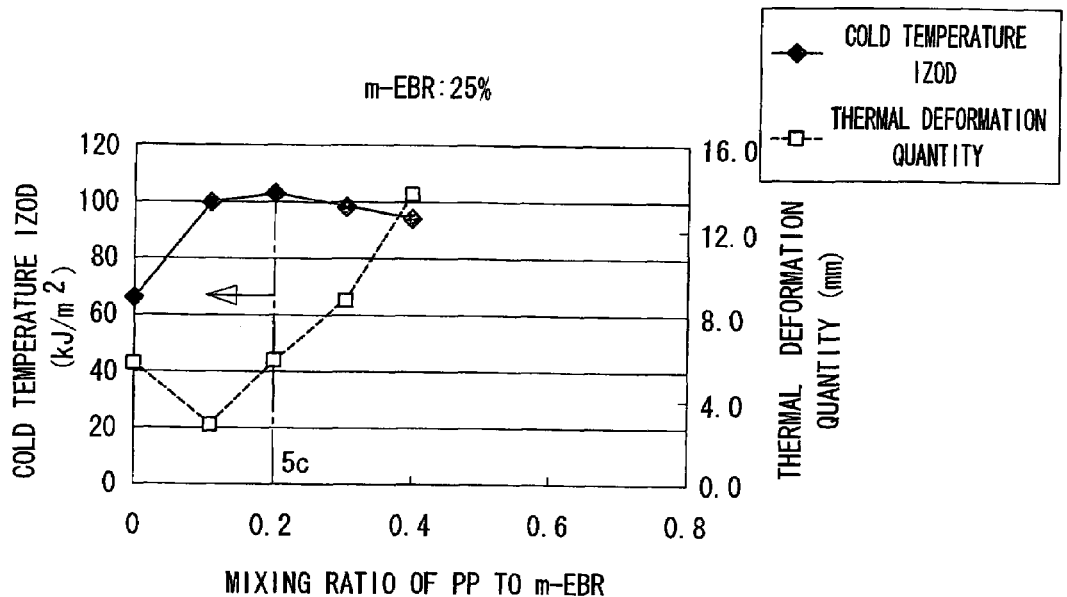
FIG. 5 is a graph showing test results in a case where a mixing quantity of a second component (B) is 25 mass % in Test I-2.

In a case of the fifth row group of FIG. 19 and the table of FIG. 5 (a mixing quantity of a second component (B) is 25 mass %), a mixing ratio of a third component (C) relative to a second component (B) that can improve both characteristics of heat resistance and impact resistance while being almost compatible with each other is 0.2 (at an actual measurement point 5c) or less and a mixing quantity of a third component (C) is in the range of 0.5 to 5 mass %. Therefore, a thermoplastic resin composition is constituted of: a second component (B) having a mixing quantity of 25 mass %; a third component (C) having a mixing quantity in the range of 0.5 to 5 mass % and a first component (A) having a mixing quantity in the range of 74.5 to 70 mass %. In the region where the mixing ratio equal to or larger than 0.2, a thermoplastic deformation quantity is larger than in a case where no third component (C) is added.

In a case of the sixth row group of FIG. 19 (a second component (B) is m-SEBS and a mixing quantity thereof is 20 mass %), a mixing quantity of a third component (C) that can improve both characteristics of heat resistance and impact resistance while being almost compatible with each other is in the range of 2.5 to 5 mass %, through not shown in the graph. Therefore, a thermoplastic resin composition is constituted of: a second component (B) having a mixing quantity of 20 mass %; a third component (C) having a mixing component in the range of 2.5 to 5 mass % and a first component (A) having a mixing quantity in the range of 77.5 to 75 mass %.

Judging from the above description, in the test I-2 in which PA9T as a first component, m-EBR or m-SEBS as a second component and PP as a third component (C) are combined, in order to improve both characteristics of heat resistance and impact resistance while being almost compatible with each other, upper limit values of a mixing quantity of a third component (C) is required to be adjusted in the way described below according to a mixing quantity of a second component (B):

A case where a mixing quantity of a component (B) is 10 mass %: an upper limit value of a third component (C) of 7.5 mass %

A case where a mixing quantity of a component (B) is 13 mass %: an upper limit value of a third component (C) of 5 mass %.

A case where a mixing quantity of a component (B) is 15 mass %: an upper limit value of a third component (C) of 6 mass %

A case where a mixing quantity of a component (B) is 20 mass %: an upper limit value of a third component (C) of 9 mass %

A case where a mixing quantity of a component (B) is 25 mass %: an upper limit value of a third component (C) of 5 mass %

It is found from the above description that in order to improve both characteristics of heat resistance and impact resistance while being compatible with each other with certainty in a combination of PA9Y as a first component (A), m-EBR or m-SEBS as a second component (B) and PP as a third component, mixing quantities are only required to be adjusted so that a second component (B) has a mixing quantity in the range of 10 to 25 mass %; a third component (C) has a mixing component in the range of 0.5 to 5 mass % and a first component (A) has a mixing quantity in the range of 89.5 to 70 mass %.

Note that in a case of the first row group of FIG. 19 and the graph of FIG. 1 (a mixing quantity of a second component (B) is 10 mass %), mixing quantities of components are set within the above ranges to thereby improve both characteristics of heat resistance and impact resistance while being almost compatible with each other as compared with a case where no third component is added, whereas since impact resistance (cold temperature IZOD value) is inherently excessively low, such a composition is not suitable for an outside plate part exposed to impact load such as a fender panel of an automobile, for example.

Therefore, in a case where it is a premise that a composition is used for a panel part requiring impact resistance, mixing quantities are preferably adjusted so that a second component (B) has a mixing quantity in the range of 13 to 25 mass % providing that the first row group of FIG. 19 and the example of FIG. 1 (a mixing quantity of the second component is 10 mass %) are excluded; a third component (C) has a mixing component in the range of 0.5 to 9 mass % and a first component (A) has a mixing quantity in the range of 86.5 to 66 mass %.

In order to secure higher impact resistance, it is preferable to adjust mixing quantities so that a second component (B) has a mixing quantity in the range of 15 to 25 mass %; a third component (C) has a mixing component in the range of 0.5 to 5 mass % and a first component (A) has a mixing quantity in the range of 84.5 to 70 mass %.

From the viewpoint of improvement with more of certainty (more suppression of a thermal deformation quantity), it is preferable to adjust mixing quantities so that a second component (B) has a mixing quantity in the range of 15 to 20 mass %; a third component (C) has a mixing component in the range of 0.5 to 9 mass % and a first component (A) has a mixing quantity in the range of 84.5 to 71 mass %.

On the other hand, in a case where a mixing quantity of a third component (B) exceeds 25 mass % (in a case where the mixing quantity is 30 mass % at an actual measurement point), as understood from the first row group of FIG. 18 (Comparative Example 7), a thermal deformation quantity is excessively large, which makes a composition unsuitable for a part receiving heat at a temperature high to some extent such as a fender panel of an automobile heated, for example, in drying after coating in on-line coating.

<Test I-3>

Test I-3 is performed on compositions consisted of: PA9T as a first component (A), m-EBR or m-EPR as a second component and one selected from the group consisting of PP, m-PP, PE, m-PE and m-EVA as a third component (C).

In the table of FIG. 20 and the graphs of FIGS. 4 and 6 to 9, there is shown mixing quantities of components and test results in Test I-3.

The row groups of FIG. 20 shows mixing quantities of the components and test results in cases where a mixing quantity of a second component (B) is fixed to a specific percent (20 mass %) and a kind and a mixing ratio of a third component (C) relative to a second component (B) are altered in various ways, wherein FIGS. 6 to 9 correspond to the second to the seventh row groups and the seventh row group.

The first row group of FIG. 20 is performed on compositions of PA9T as a first component, m-EBR as a second component (B) and PP as a third component (C), which is equivalent to a row group obtained by omitting Comparative Example 26 from the fourth row group of FIG. 19, and Examples 21, 22 and 23, and Comparative Example 30 are the same as Examples 8, 9 and 10, and Comparative Example 25. Hence, the graph of FIG. 4 almost corresponds to the first row group of FIG. 20 and the test results are also similar to those described in the fourth row group of FIG. 19 and the description of FIG. 4.

Figure 6:
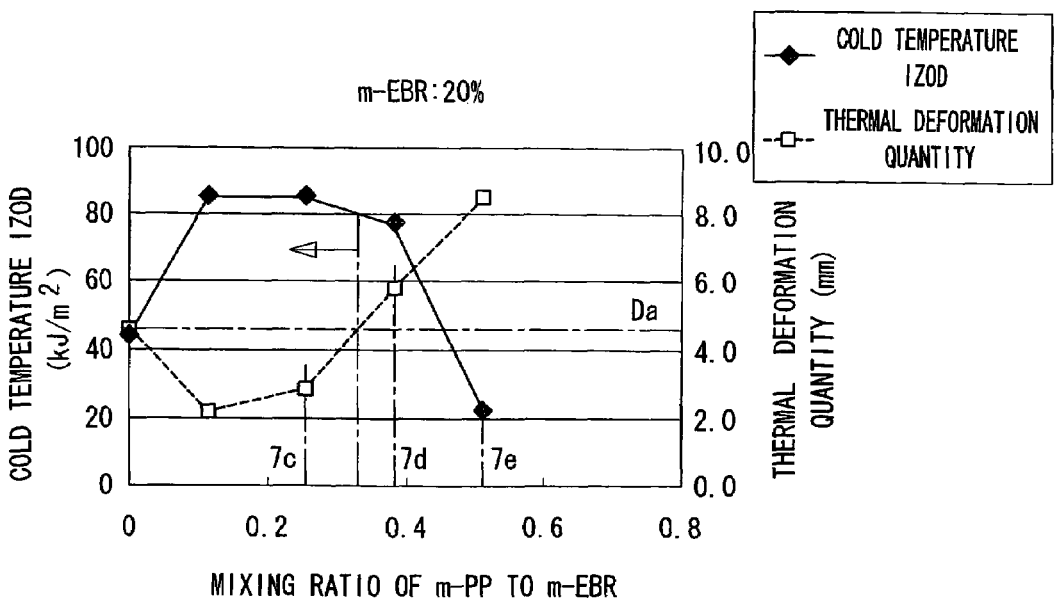
FIG. 6 is a graph showing test results in a case where a third component (C) is m-PP resin in Test I-3 related to an embodiment of the invention.

The second row group of FIG. 20 is performed on compositions of PA9T as a first component (A), m-EBR as a second component (B) and m-PP as a third component (C), and the graph of FIG. 6 corresponds to the second row group of FIG. 20.

In the compositions, a mixing ratio of a third component (C) relative to a second component (B) that can improve both characteristics of heat resistance and impact resistance while being compatible with each other is 0.318 or less and a mixing quantity of a third component (C) is in the range of 0.5 to 6.36 mass %. Therefore, a thermoplastic resin composition is constituted of: a second component (B) having a mixing quantity of 20 mass %; a third component (C) having a mixing quantity in the range of 0.5 to 6.36 mass % and a first component (A)

having a mixing quantity in the range of 79.5 to 73.64 mass %. In the region where the mixing ratio exceeds 0.318, a thermoplastic deformation quantity is larger than in a case where no third component (C) is added.

In a case of the test of FIG. 6, since a reference value Da for a thermal deformation quantity is located between an actual measuring point 7c with a mixing ratio of 0.25 (Example 26) and an actual measurement point 7d with a mixing ratio of 0.375 (Comparative Example 31), linear interpolation similar to a case described above was applied between the two adjacent actual measurement points 7c and 7d to thereby obtain the upper limit value of the third component (C).

Note that in this case, while impact resistance (in cold temperature IZOD expressed with a kinked solid line) is lower at the actual measurement point 7e to a value lower than in a case where no third component (C) is added (a mixing ratio is zero), the upper limit value of a mixing ratio of a third component (C) for impact resistance is higher than the upper limit value for heat resistance.

Figure 7:
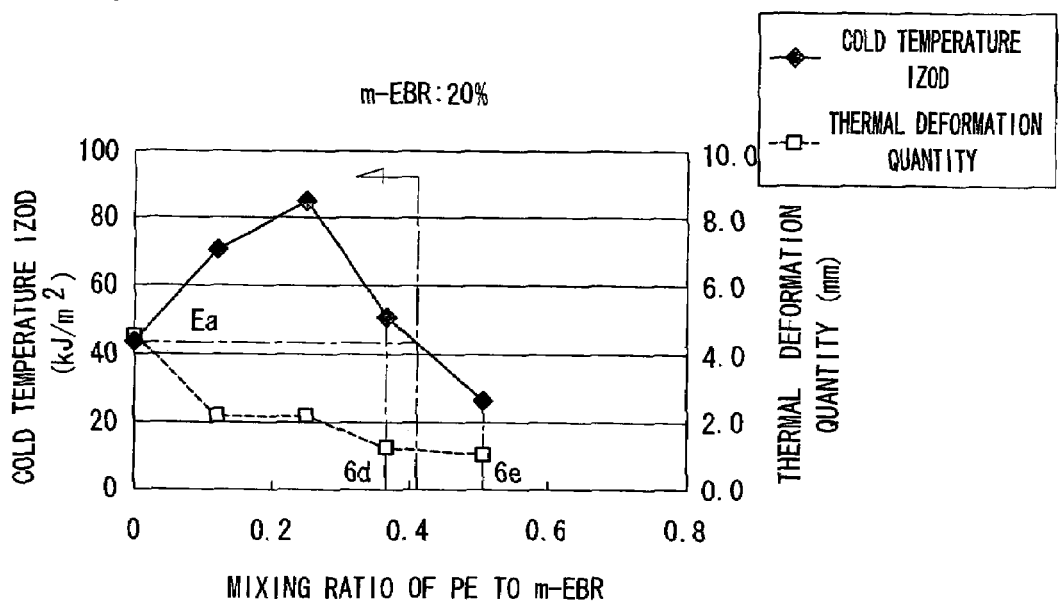
FIG. 7 is a graph showing test results in a case where a third component (C) is PE resin in Test I-3.

The third row group of FIG. 20 is performed on compositions of PA9T as a first component (A) with m-EBR as a second component (B) and PE as a third component (C), and the graph of FIG. 7 corresponds to the third row group of FIG. 20.

In the compositions, a mixing ratio of a third component (C) relative to a second component (B) that can improve both characteristics of heat resistance and impact resistance while being compatible with each other is 0.412 or less and a mixing quantity of a third component (C) is in the range of 0.5 to 8.24 mass %. Therefore, a thermoplastic resin composition is constituted of: a second component (B) having a mixing quantity of 20 mass %; a third component (C) having a mixing quantity in the range of 0.5 to 8.24 mass % and a first component (A) having a mixing quantity in the range of 79.5 to 71.76 mass %. In the region where the mixing ratio exceeds 0.412, a cold temperature IZOD value is smaller than in a case where no third component (C) is added.

In a case of the test of FIG. 7, since a reference value Ea for a cold temperature IZOD value is located between an actual measuring point 6d with a mixing ratio of 0.375 (Example 33) and an actual measurement point 6e with a mixing ratio of 0.5 (Comparative Example 33), linear interpolation similar to a case described above was applied between the two adjacent actual measurement points 6d and 6e to thereby obtain the upper limit value of the third component (C).

Note that in this case, heat resistance (an deformation quantity expressed with a kinked broken line) has no limit value as described above since there is no possibility that heat resistance is smaller and a thermal deformation quantity is larger at any measurement point in a measurement range than in a case where no third component (C) is added (a mixing ratio is zero).

Figure 8:
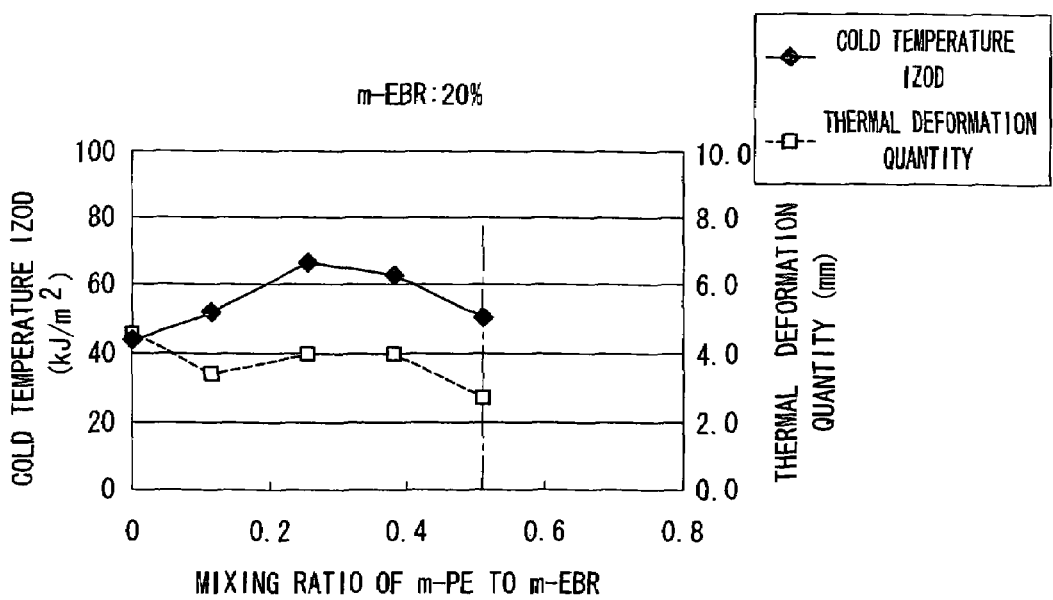
FIG. 8 is a graph showing test results in a case where a third component (C) is m-PE resin in Test I-3.

The fourth row group of FIG. 20 is performed on compositions of PA9T as a first component (A), m-EBR as a second component (B) and m-PE as a third component (C), and the graph of FIG. 8 corresponds to the fourth row group of FIG. 20.

In the compositions, a mixing ratio of a third component (C) relative to a second component (B) that can improve both characteristics of heat resistance and impact resistance while being compatible with each other is 0.5 or more and in a case of a mixing ratio of 0.5, a mixing quantity of a third component (C) is in the range of 0.5 to 10 mass %. Therefore, a thermoplastic resin composition is constituted of: a second component (B) having a mixing quantity of 20 mass %; a third component (C) having a mixing quantity in the range of 0.5 to 10 mass % and a first component (A) having a mixing quantity in the range of 79.5 to 70 mass %.

The fifth row group of FIG. 20 is performed on compositions of PA9T as a first component (A), m-EBR as a second component (B) and m-EVA as a third component (C). In this case, though being not shown in the graph, a mixing quantity of a third component (C) that can improve both characteristics of heat resistance and impact resistance while being almost compatible with each other is in the range of 2.5 to 5 mass %. Therefore, a thermoplastic resin composition is constituted of: a second component (B) having a mixing quantity of 20 mass %; a third component (C) having a mixing quantity in the range of 2.5 to 5 mass % and a first component (A) having a mixing quantity in the range of 77.5 to 75 mass %.

The sixth row group of FIG. 20 was performed on compositions in which mixing quantities of a first component (A), a second component (B) and a third component (C) were fixed at specific percentages (75, 20 and 5 mass %, respectively) and a second component (B) was specified as m-EBR and a third component (C) was selected one from the group consisting of PP, m-PP, PE, and m-PE, which were compiled by extracting Examples 9, 26,32 and 36 of the invention.

The seventh row group of FIG. 20 is performed on compositions of PA9T as a first component (A), m-EBR as a second component (B) and PP as a third component (C), and the graph of FIG. 9 corresponds to the sixth row group of FIG. 20.

In the compositions, a mixing ratio of a third component (C) relative to a second component (B) that can improve both characteristics of heat resistance and impact resistance while being compatible with each other is 0.5 or more at actual measurement points and in a case of a mixing ratio of 0.5, a mixing quantity of a third component (C) is in the range of 0.5 to 10 mass %. Therefore, a thermoplastic resin composition is constituted of: a second component (B) having a mixing quantity of 20 mass %; a third component (C) having a mixing component in the range of 0.5 to 10 mass % and a first component (A) having a mixing quantity in the range of 79.5 to 70 mass %.

<Test I-4>

Test I-4 is performed on compositions of: PA6T as a first component (A), m-EBR or m-EPR as a second component and one selected from the group consisting of PP, m-PP, PE and m-PE as a third component (C).

In the table of FIG. 21 and the graphs of FIGS. 10 to 14, there are shown mixing quantities of components and test results in Test I-4.

The row groups in the table of FIG. 21 show mixing quantities of the components and test results in cases where a mixing quantity of a second component (B) is fixed to a specific percent (20 mass %) and a kind and a mixing ratio of a third component (C) relative to a second component (B) are altered in various ways, wherein FIGS. 10 to 14 correspond to the first to the fifth row groups.

Figure 10:
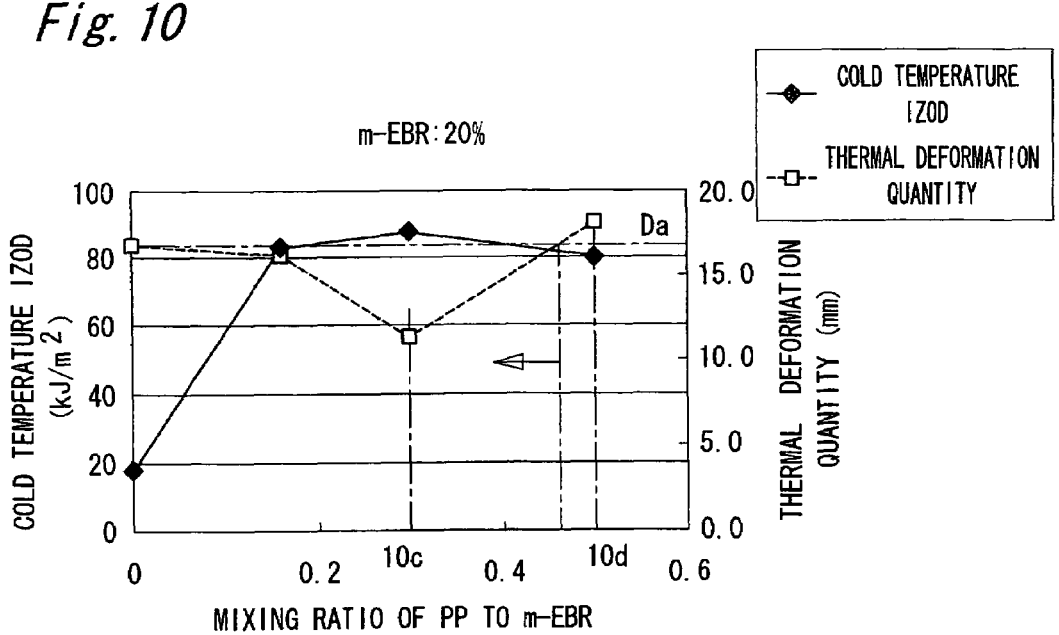
FIG. 10 is a graph showing test results in a case where a third component (C) is PP resin in Test I-4 related to an embodiment of the invention.

The first row group of FIG. 21 is performed on compositions of PA6T as a first component (A), m-EBR as a second component (B) and PP as a third component (C), and the graph of FIG. 10 corresponds to the first row group of FIG. 21.

In the compositions, a mixing ratio of a third component (C) relative to a second component (B) that can improve both characteristics of heat resistance and impact resistance while being compatible with each other is 0.46 or less and a mixing quantity of a third component (C) is in the range of 0.5 to 9.2 mass %. Therefore, a thermoplastic resin composition is constituted of: a second component (B) having a mixing quantity of 20 mass %; a third component (C) having a mixing quantity in the range of 0.5 to 9.2 mass % and a first component (A)

having a mixing quantity in the range of 79.5 to 74 mass %. In the region where the mixing ratio exceeds 0.46, a thermoplastic deformation quantity is larger than in a case where no third component (C) is added.

In a case of the test of FIG. 10, since a reference value Da for a thermal deformation quantity is located between an actual measuring point 10c with a mixing ratio of 0.3 (Example 302) and an actual measurement point 10d with a mixing ratio of 0.5 (Comparative Example 302), linear interpolation similar to a case described above was applied between the two adjacent actual measurement points 10c and 10d to thereby obtain the upper limit value of a mixing quantity of the third component (C).

Note that in this case, since there is no possibility that impact resistance (in cold temperature IZOD expressed with a kinked solid line) is lower at any actual measurement point in a measurement range than in a case where no third component (C) is added (a mixing ratio is zero), the upper limit value does not exist.

Figure 11:
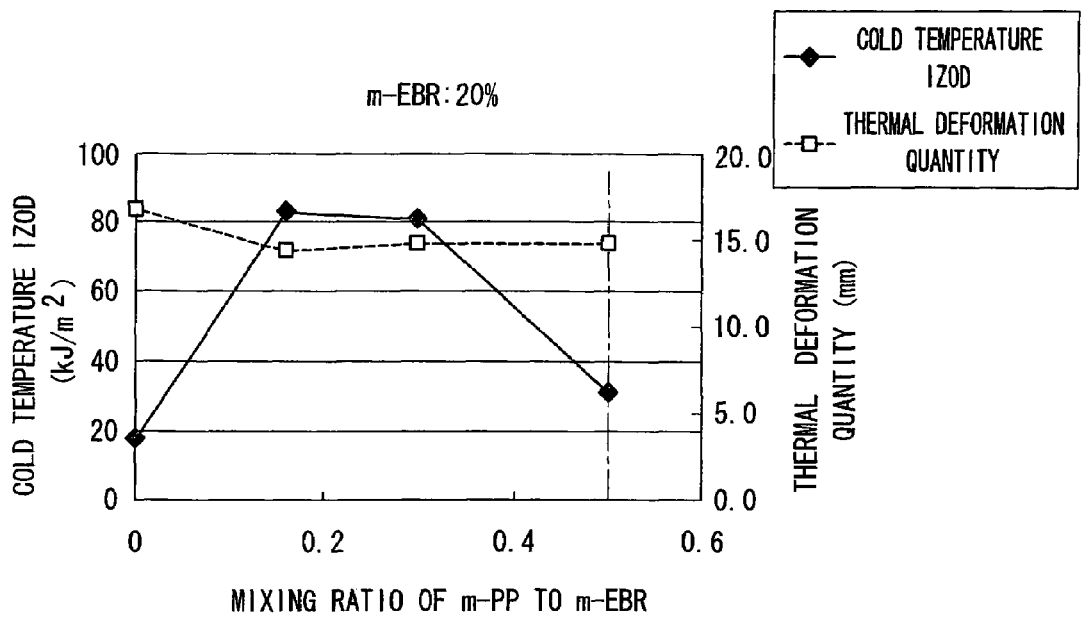
FIG. 11 is a graph showing test results in a case where a third component (C) is m-PP resin in Test I-4.

The second row group of FIG. 21 is performed on compositions of PA6T as a first component (A), m-EBR as a second component (B) and m-PP as a third component (C), and the graph of FIG. 11 corresponds to the second row group of FIG. 21.

In the compositions, a mixing ratio of a third component (C) relative to a second component (B) that can improve both characteristics of heat resistance and impact resistance while being compatible with each other is 0.5 or less at an actual measurement point and in a case of a mixing ratio of 0.5, a mixing quantity of a third component (C) is in the range of 0.5 to 10 mass %. Therefore, a thermoplastic resin composition is constituted of: a second component (B) having a mixing quantity of 20 mass %; a third component (C) having a mixing component in the range of 0.5 to 10 mass % and a first component (A) having a mixing quantity in the range of 79.5 to 70 mass %.

Figure 12:
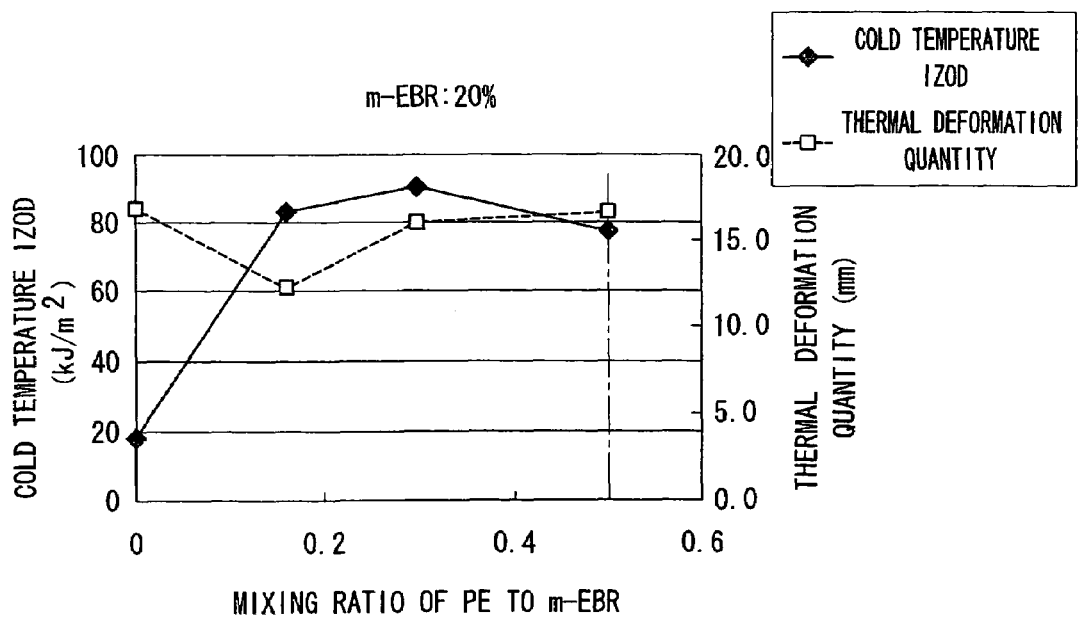
FIG. 12 is a graph showing test results in a case where a third component (C) is PE resin in Test I-4.

The third row group of FIG. 21 is performed on compositions of PA6T as a first component (A), m-EBR as a second component (B) and PE as a third component (C), and the graph of FIG. 12 corresponds to the third row group of FIG. 21.

In the compositions, a mixing ratio of a third component (C) relative to a second component (B) that can improve both characteristics of heat resistance and impact resistance while being compatible with each other is 0.5 or less at an actual measurement point and in a case of a mixing ratio of 0.5, a mixing quantity of a third component (C) is in the range of 0.5 to 10 mass %. Therefore, a thermoplastic resin composition is constituted of: a second component (B) having a mixing quantity of 20 mass %; a third component (C) having a mixing quantity in the range of 0.5 to 10 mass % and a first component (A) having a mixing quantity in the range of 79.5 to 70 mass %.

Figure 13:
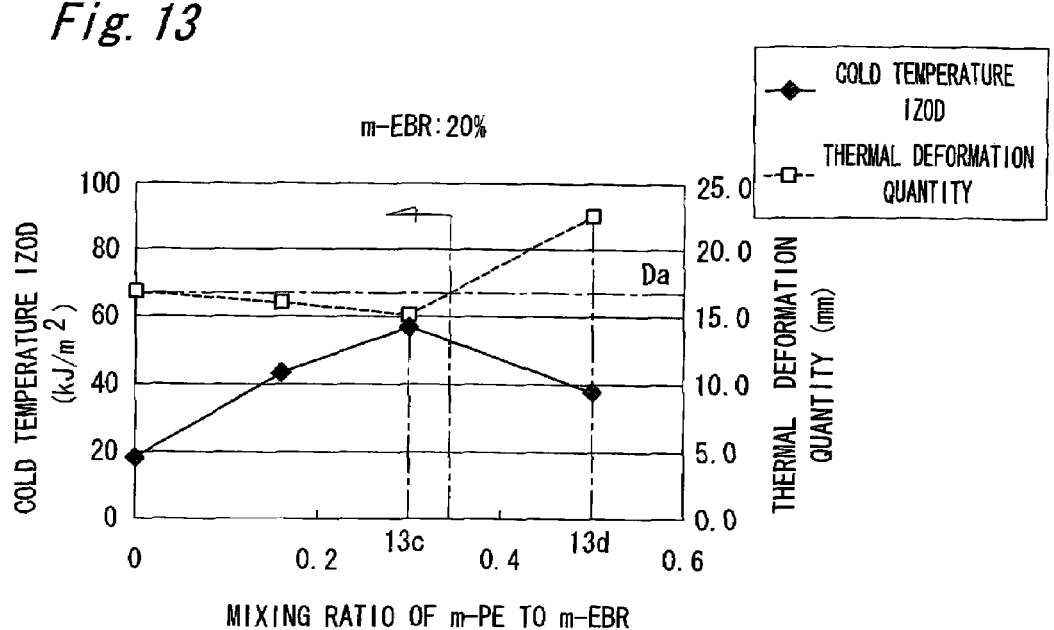
FIG. 13 is a graph showing test results in a case where a third component (C) is m-PE resin in Test I-4.

The fourth row group of FIG. 21 is performed on compositions of PA6T as a first component (A), m-EBR as a second component (B) and m-PE as a third component (C), and the graph of FIG. 13 corresponds to the fourth row group of FIG. 21.

In the combinations, a mixing ratio of a third component (C) relative to a second component (B) that can improve both characteristics of heat resistance and impact resistance while being compatible with each other is 0.345 or less and in a case of a mixing ratio of 0.345, a mixing quantity of a third component (C) is in the range of 0.5 to 6.9 mass %. Therefore, a thermoplastic resin composition is constituted of: a second component (B) having a mixing quantity of 20 mass %; a third component (C) having a mixing component in the range of 0.5 to 6.9 mass % and a first component (A) having a mixing quantity in the range of 79.5 to 73.1 mass %. In a region where a mixing ratio exceeds 0.345, a thermal deformation quantity is larger than in a case where no third component is added.

In a case of the test of FIG. 13, since a reference value Da for a thermal deformation quantity is located between an actual measuring point 13c with a mixing ratio of 0.3 (Example 316) and an actual measurement point 13d with a mixing ratio of 0.5 (Comparative Example 303), linear interpolation similar to a case described above was applied between the two adjacent actual measurement points 13c and 13d to thereby obtain the upper limit value of a mixing quantity of the third component (C).

Note that in this case, since there is no possibility that impact resistance (in cold temperature IZOD expressed with a kinked solid line) is lower at any actual measurement point in a measurement range than in a case where no third component (C) is added (a mixing ratio is zero), the upper limit value does not exist.

Figure 14:
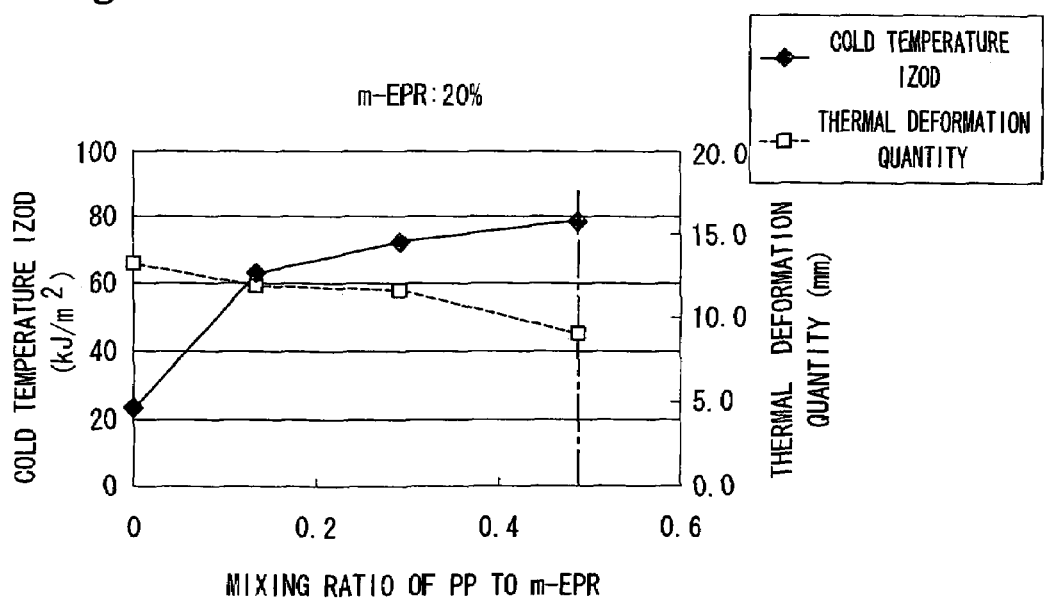
FIG. 14 is a graph showing test results in a case where a second component is m-EPR and a third component (C) is PP resin in Test I-4.

The fifth row group of FIG. 21 is performed on compositions of PA6T as a first component (A), m-EPR as a second component (B) and PP as a third component (C), and the graph of FIG. 14 corresponds to the fifth row group of FIG. 21.

In the compositions, a mixing ratio of a third component (C) relative to a second component (B) that can improve both characteristics of heat resistance and impact resistance while being compatible with each other is 0.5 or less at an actual measurement point and in a case of a mixing ratio of 0.5, a mixing quantity of a third component (C) is in the range of 0.5 to 10 mass %. Therefore, a thermoplastic resin composition is constituted of: a second component (B) having a mixing quantity of 20 mass %; a third component (C) having a mixing quantity in the range of 0.5 to 10 mass % and a first component (A) having a mixing quantity in the range of 79.5 to 70 mass %.

A table of FIG. 22 is a table obtained by compiling Test I, in a simple way, performed on compositions obtained by using a polyamide resin component (A) as a first component (a base material component), to which an acid modified elastomer (B) as a second component is added, and further to which an olefin-based resin component as a third component (C) is added, and some of comparative examples and examples were extracted from the tables of FIGS. 19 to 21 and compiled according to the purpose.

The first row group of FIG. 22 shows that in a case where PA9T or PA6T is used as a first component, m-EMR is used as a second component, and PP resin is added into the mixture as a third component to thereby enable both characteristics of heat resistance and impact resistance are improved while being compatible with each other (Examples 9 and 302).

The second row group of FIG. 22 showed comparative examples in which no third component (C) was added in a case where PA9T was used as a first component, m-EMR was used as a second component, and a mixing quantity of the second component was altered in various ways in the range of 10 to 25 mass %, wherein Comparative Examples 2 to 6 were extracted from the test results of Test I-1 (the table of FIG. 18).

The third row group of FIG. 22 showed examples in which a predetermined quantity (5 mass %) of PP resin as a third component (C) was added in a case where PA9T was used as a first component (A), m-EMR was used as a second component (B) and a mixing quantity of the second component was altered in various ways in the range of 10 to 25 mass %, wherein Examples 2, 5, 7 and 9 and Comparative Example 27 were extracted from the table of FIG. 19.

It is understood by comparing the second row group of FIG. 22 with the third row group of FIG. 22 that both characteristics of heat resistance and impact resistance can be improved while being matched with each other.

The fourth row group of FIG. 22 shows that in a case where PA9T is used as a first component and m-EBR is used as a second component, both characteristics of heat resistance and impact resistance are improved while being compatible with each other by adding PP resin as a third component (C) (Example 9).

The fifth row group of FIG. 22 shows that in a case where PA9T is used as a first component and m-EPR is used as a second component, both characteristics of heat resistance and impact resistance are improved while being compatible with each other by adding PP resin as a third component (C) (Example 102).

The sixth row group of FIG. 22 shows that in a case where PA9T is used as a first component and m-SEBS is used as a second component, both characteristics of heat resistance and impact resistance are improved while being compatible with each other by adding PP resin as a third component (C) (Example 202).

According to the embodiment, as described above, a thermoplastic resin composition in a three component system was basically prepared by using a polyamide component (A) as a first component (a base material component), to which an acid modified elastomer (B) was added as a second component and further to which an olefin-based resin component was added as a third component, and both characteristics of heat resistance and impact characteristic thereof were able to be improved in a good balance while compatibility with each other was kept by mixing the three components in proper mixing quantities.

A molded product obtained from a resin composition obtained as described above were observed on a microstructure thereof with a transmission electron microscope (TEM).

Figure 16:
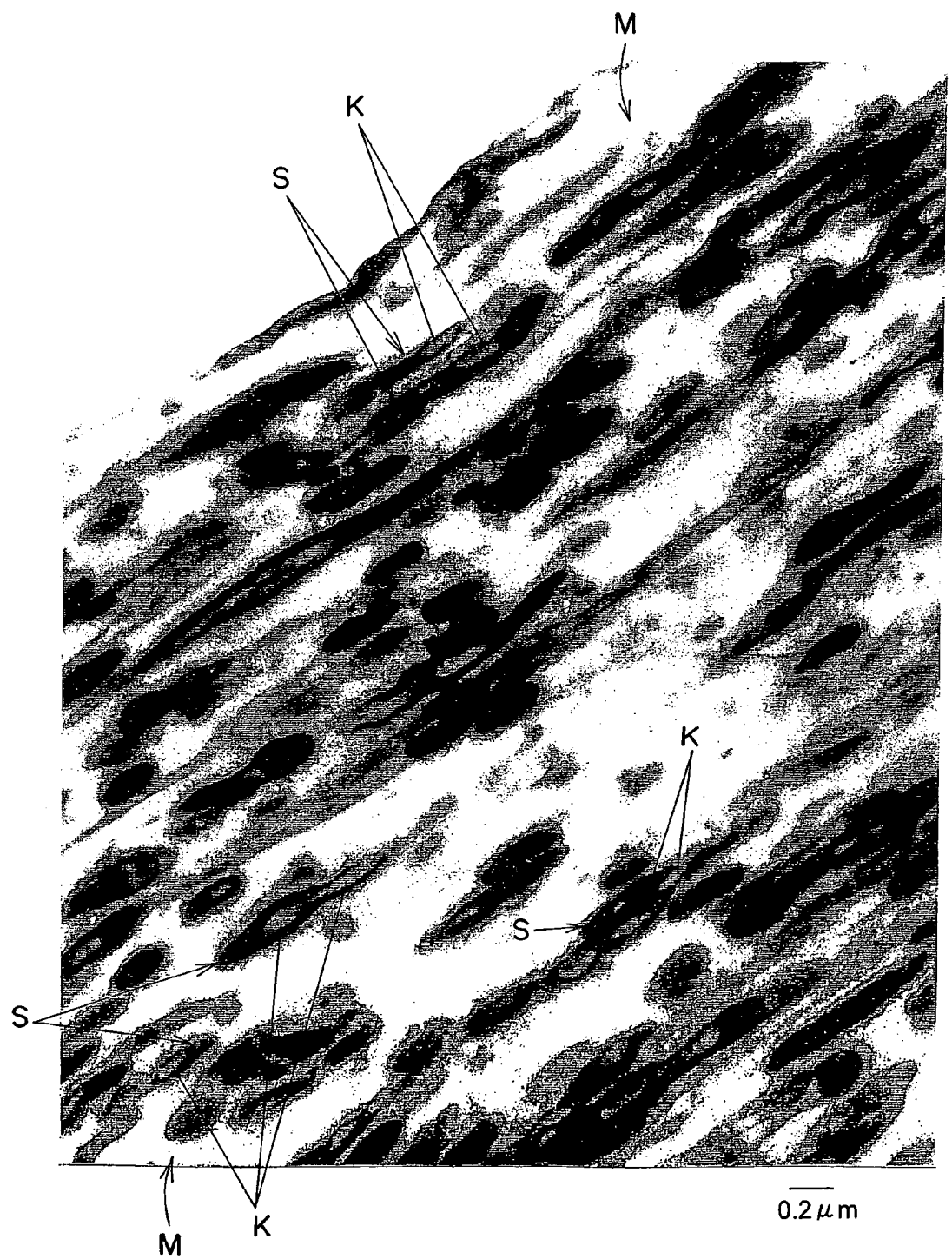
FIG. 16 is a microscopic photograph of a micro structure in TEM observation on a resin molded product related to an embodiment of the invention.

FIG. 16 is a microscopic photograph (magnification of 50000X) of a micro structure in TEM observation on a resin molded product made from a resin composition obtained by using, for example, a combination of Example 1, in which PA9T is used as a base material component (A), m-EBR is used as a component (B) and PP is used as a component (C), wherein a mixing quantity of the component (B) is 20 mass % and a mixing ratio of the component (C) relative to the component (B) is set to, for example, 0.375 in order to improve both characteristics of heat resistance and impact resistance with a good compatibility with each other being kept.

In FIG. 16, a white region, which is a base, shows a matrix phase M constituted of a polyamide resin component (PA9T), a black region shows a shell phase S constituted of an modified olefin copolymer (m-EBR as a rubber component) and a white or gray portion inside the black shell phase S shows a core phase K constituted of n olefin-based resin component (PP resin).

That is, the resin molded product was confirmed to be a system in the form and of a construction in which a dispersion phase of a core-shell type particle structure formed with a modified olefin copolymer component (rubber component) as a shell phase and an olefin-based resin component (PP resin) as a core phase K are formed in a matrix phase M constituted of a polyamide resin component; in other word, a so-called "a sea island lake" type particle structure in which a polyamide resin component assumes a sea (a matrix phase M), a rubber component assumes an island (shell phase S) and an olefin-based resin component assumes a lake inside an island (core phase K), is dispersed.

It is thought from the observation results on the microstructure that such a morphology greatly contributes to improvement on both characteristics of heat resistance and impact resistance in a good balance with compatibility with each other being kept. That is, in order to improve both characteristics of heat resistance and impact resistance in a good balance with compatibility with each other being kept, it is thought to be important to realize a morphology having a dispersion state of a core-shell type particle structure formed in a matrix by setting proper mixing proportions of a polyamide resin component, a modified olefin copolymer component and an olefin-based resin component.

[Test II]

Description will be then given of Test II using a filler component (D) as a third component.

A thermoplastic resin composition related to Test II is prepared by dispersing a dispersion phase of a core-shell type particle structure obtained by prekneading an elastomer component (B) having a content in the range of 13 to 20 mass % relative to a total system included as a shell phase and a filler component (D) having a content of 8 mass % or less relative to the total system included as a core phase in a matrix phase constituted of a polyamide resin component (A).

Here, in a case where a filler (D) is added as a third component, a mixing quantity has only to be 8 mass % or less (but not zero), while since the practical minimum quantity that can be added with certainty is regarded as about 0.5 mass %, a mixing quantity of a filler component (D) is preferably in the range of 0.5 to 8 mass % from the view point of preservation of a weighing precision.

In the embodiment, description will be given of how well impact resistance (cold temperature IZOD (kJ/m$^2$)) and heat resistance (a thermal deformation quantity in mm) are balance using a concrete example of such a thermal plastic composition.

In this case, polyamide 9T is used as a polyamide component. A modified olefin copolymer component is used as an elastomer component and to be more concrete, a modified ethylene-butene copolymer (m-EBR) or a modified styrene-ethylene-butadiene-styrene terpolymer (m-SEBS) is used at various mixing ratios. Calcium carbonate, talc or silica each with different particle diameters from the others (in the range of 0.08 to 0.7 µm) is used at various mixing ratios as a filler component. A composition including polypropylene (PP) mixed as a fourth component was evaluated.

Figure 17A:
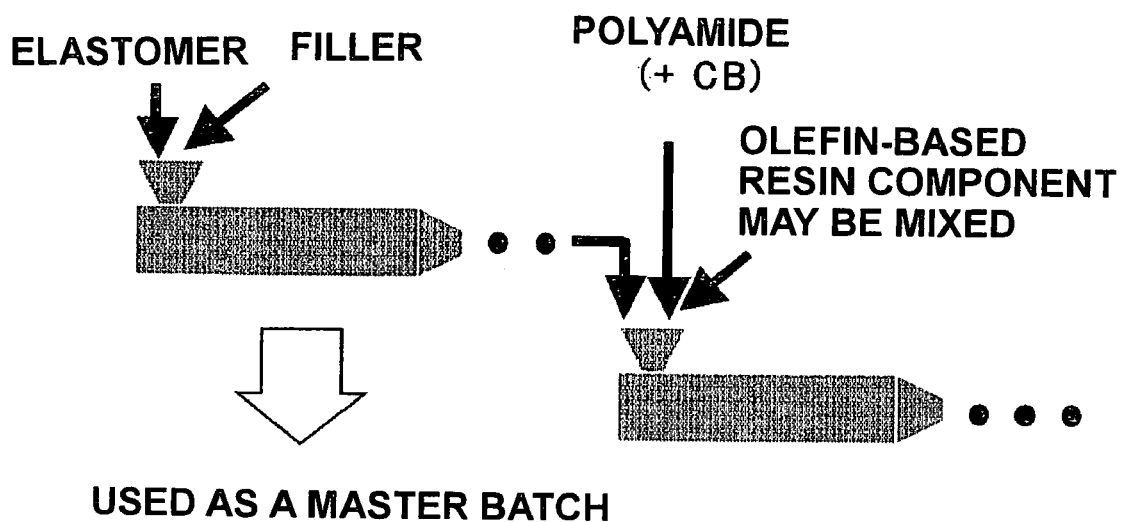
FIGS. 17(a) and 17(b) are explanation drawings showing a prekneading method for a thermoplastic resin composition related to an embodiment of the invention.
Figure 17B:
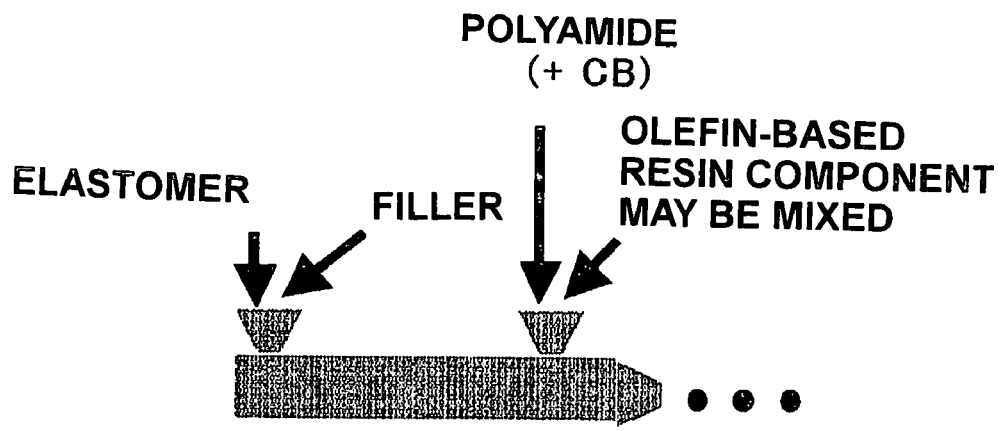

A filler is used in a state where being prekneaded into an elastomer component, with which the filler not kneaded into the elastomer component were compared, and results of the comparison are shown. A filler prekneaded into a rubber component may be obtained as a MB (a master batch) in extrusion molding in a preceding step of kneading with polyamide (FIG. 17(a)) or alternatively, by prekneading a filler into an elastomer in the front portion of the extrusion feeder in a kneading step with polyamide (FIG. 17(b)). No specific limitation is placed on a method adopted in a manufacturing step. It has been known that with such prekneading adopted, a dispersion phase of a core-shell type particle structure formed with an elastomer component as a shell phase (a so-called island) and a filler as a core phase (a so-called a lake in an island) is effectively dispersed in a matrix phase (a so-called sea) constituted of a polyamide resin component.

A thus obtained thermoplastic resin composition as a material was molded into resin molded products to thereby prepare common test pieces each with a thickness of 3.2 mm from the resin molded products of different kinds for a cold temperature impact test, and a thermal deformation test in a similar way to that in a case of Test I and a cold temperature impact test was performed by means of the IZOD impact test method according to JIS K 7110 and a thermal deformation test was performed by means of the heat sag test method according to JIS K 7190 at a test temperature of 190° C.

<Test II-1>

Test II-1 was performed on test pieces from compositions in which polyamide 9T (PA9T) is used as a first component, into which a modified ethylene-butene copolymer (m-EBR) having a content of 13 or 20 mass % was added, and further into which a filler was mixed as a third component (D), wherein a mixing ratios was altered in various ways. Calcium carbonate with an average particle diameter of 0.1 μm was used as a filler component (D). A modified ethylene-butene copolymer (m-EBR) having a content of 13 or 20 mass % into which calcium carbonate with an average particle diameter of 0.1 μm was mixed as a filler component (D) was dispersed into a polyamide 9T (PA9T) as a matrix phase.

In the table of FIG. 23, there are shown mixing quantities of components and test results in Test II-1.

In a case where, as shown in the first row group of FIG. 23, a dispersion phase obtained by prekneading calcium carbonate (a third component (D)) with a content of 8 mass % or less into a modified ethylene-butene copolymer (m-EBR: a second component (B)) with a content of 20 mass % was dispersed into a matrix phase constituted of polyamide (PA9T: a first component (A)) (Examples 500 to 503), it is found that impact resistance and heat resistance are improved as compared with Comparative Example 5 in which no third component (D) is added.

In a case where, as shown in Comparative Examples 500 and 501, calcium carbonate (a third component D) with a content more than 8 mass % is prekneaded into a modified ethylene-butene copolymer (m-EBR: a second component (B)) with a content of 20 mass %, it is found that heat resistance does not change so much but impact resistance is lower as compared with a case where a modified ethylene-butene copolymer (m-EBR: a second component (B)) with a content of 20 mass % is simply mixed into polyamide 9T (PA9T: a first component (A)) without mixing a filler (a third component (D)) (Comparative Example 5).

In a case where, as shown in the third row group of FIG. 23, calcium carbonate (a third component (D)) is mixed into a modified ethylene-butene copolymer (m-EBR), which is a second component (B), with a content of 20 mass % without prekneading, it is found that impact resistance is lower regardless of a quantity of calcium carbonate (a third component (D)) as compared with a case where no calcium carbonate is mixed.

On the other hand, in a case where, as shown in the second row group of FIG. 23, a dispersion phase obtained by prekneading calcium carbonate (a third component (D)) with a content in the range of 1 to 5 mass % into a modified ethylene-butene copolymer (m-EBR: a second component (B)) with a content of 13 mass % was dispersed into a matrix phase constituted of a polyamide component (a first component (A)), it is found that impact resistance and heat resistance are both improved as compared with a case where a modified ethylene-butene copolymer (m-EBR) with a content of 20 mass % is simply mixed into polyamide 9T (PA9T) (Comparative Example 3).

On the other hand, in a case where, as shown in the fourth row group of FIG. 23, calcium carbonate (a third component (D)) is mixed into a modified ethylene butene copolymer (m-EBR: a second component (B)) with a content of 13 mass % without prekneading, it is found that impact resistance is lower as compared with a case where no calcium carbonate is mixed.

The fifth row group of FIG. 23 shows an example in which a modified styrene-ethylene-butadiene-styrene terpolymer (m-SEBS) obtained by hydrogenating a styrene-butadiene copolymer is used as a second component (B). Note that calcium carbonate with an average particle diameter of 0.1 μm is used as a third component (D).

In this case, by prekneading a filler component (a third component (D)) as shown in Example 801, it is found that impact resistance and heat resistance are both improved as compared with a case where no filler is mixed (Comparative Example 251). On the other hand, it is found that without prekneading, impact resistance is lower as shown in Comparative Example 252.

<Test II-2>

Test II-2 is a test in which polyamide 9T (PA9T) is used as a first component (A), into which a modified ethylene-butene copolymer (m-EBR) with a content of 20 mass % is added as a second component (B), and further to which a filler with a predetermined content (5 mass %) is added as a third component (D), wherein particle diameters of the filler component (D) are altered in various ways. Calcium carbonate with various average particle diameters in the range of 0.02 to 6 μm was used as the filler component (D).

In the table of FIG. 24, there are shown mixing quantities of components, average particle diameters of a filler and test results in Test II-2.

As the result of experiments that were performed altering an average particle diameter of calcium carbonate (a third component (D)) in various ways, it is found that in a case where calcium carbonate with an average particle diameter in the range of 0.08 to 0.7 μm was prekneaded into a modified ethylene-butene copolymer (m-EBR: a second component (D)) (Examples 510 to 513), heat resistance and impact resistance were both improved as compared with a case where no filler is added (Comparative Example 5).

It is found that with calcium carbonate to be prekneaded having an average particle diameter outside the range of 0.08 to 0.7 μm adopted, impact resistance is greatly lower as shown in Comparative Examples 520, 521, 522 to 524.

It is found that in a case where, as shown in the second row group of FIG. 24, no calcium carbonate (a third component (D)) is prekneaded, impact resistance is greatly lower regardless of particle sizes of calcium carbonate.

<Test II-3>

Test II-3 is a test including examples in which filler components (a third component (D)) different from calcium carbonate are employed.

In a table of FIG. 25, there are shown mixing quantities of components, average particle diameters and test results in Test II-3.

The first row group of FIG. 25 are examples using calcium carbonate is used as a filler component (a third component (D)).

The second row group of FIG. 25 are examples using talc with an average particle diameter of 0.5 μm is used as a filler component (a third component (D)).

In this case, it is found that with prekneading, as shown in Examples 550 and 551, impact resistance and heat resistance are both improved as compared with a case where no filler component is mixed (Comparative Example 5) or as compared with a case where calcium carbonate is mixed as a filler component (Examples 500 to 502). On the other hand, it is found that without prekneading, as shown in Comparative Examples 551 to 553, impact resistance is lower.

The third row group of FIG. 25 are examples using silica with an average particle diameter of 0.15 μm as a filler component (a third component (D)). In this case, it is found that with prekneading adopted, as shown in Example 560, heat resistance is slightly improved as compared with a case where no filler component is mixed (Comparative Example 5). On the other hand, it is found that without prekneading, as shown in Comparative Example 560, impact resistance is lower.

Note that calcium carbonate as a filler component (D) to which a different component, for example polypropylene (PP), is mixed can also be used as a third component.

For example, a dispersion state of a core-shell particle structure constituted of a modified ethylene-butene copolymer (m-EBR) with a content of 20 mass % as a shell phase and 5 mass % of a calcium carbonate with an average diameter of 0.1 μm to which polypropylene with a content of 5 mass % is mixed as a core phase is dispersed into polyamide 9T (PA9T) as a matrix phase to thereby enable a specimen to be obtained.

In this case, with a prekneaded filler component (D) adopted, impact resistance and heat resistance are both improved as compared with a case where no filler is mixed. On the other hand, without prekneading, impact resistance is lower.

FIG. 26 shows a table summarizing, in a simple way, Test II in which polyamide resin component (A) is used as a first component (base material component), to which an acid modified elastomer (B) is added as a second component, and further to which a filler component (D) is added as a third component, and obtained by compiling some of comparative examples and examples extracted from the tables of FIGS. 23 to 25 according to the purpose.

The first to third row groups of FIG. 26 show that in a case where PA9T is used as a first component and m-EBK is used as a second component, heat resistance and impact resistance can be improved while being compatible with each other by adding prekneaded calcium carbonate as a third component (D) (Examples 507, 502 and 512) as compared with Comparative Examples 3 and 5 in which no third component is added.

The fourth row group of FIG. 26 shows that in a case where PA9T is used as a first component and m-SEBS is used as a second component, heat resistance and impact resistance can be both improved while being compatible with each other by adding prekneaded calcium carbonate as a third component (D) (Example 701) as compared with Comparative Example 201 in which no third component is added.

<Test II-4>

Test II-4 is a test in which a fourth component is added to a first component (A), a second component (B) and a third component (D) and in the test, polypropylene (PP) is mixed as a fourth component.

In a table of FIG. 27, there is shown mixing quantities, average particle diameters of components and test results in Test II-4.

Comparative Example 561 and Example 561 shown in the table of FIG. 27 both use a composition in which PA9T is included as a first component (A), m-EBR is included as a second component (B) and calcium carbonate with an average particle diameter of 0.1 μm is included as a third component (D), wherein in Comparative Example 561, the third component (D) is not prekneaded prior to use, while in Example 561, the third component (D) is prekneaded prior to use.

In the test, though not stated in the table of FIG. 27, polypropylene (PP) with a content of 5 mass % was added as a fourth component in both of Comparative Example 561 and Example 561. Even in a case where the fourth component was added in this way, it was found that heat resistance and impact resistance both can be improved while being compatible with each other by adding prekneaded calcium carbonate (D) (Example 561) as compared with a case where a third component (D) is added without prekneading (Comparative Example 561).

According to the embodiment, as described above, in a case where a polyamide resin component (A) was used as a first component (base material component), to which an acid modified elastomer (B) was added as a second component and further to which an olefin-based resin component (C) or a filler component (D) with a proper average particle diameter was added as a third component to thereby basically prepare a thermoplastic resin composition in a three component system, wherein the three components were mixed together in proper mixing quantities, heat resistance and impact resistance both were able to be improved in good balance while being compatible with each other.

That is, according to the embodiment, a thermoplastic resin composition high in heat resistance and impact resistance with compatibility with each other can be realized and a molded product high in heat resistance and impact resistance with compatibility with each other can be attained by molding such a thermoplastic resin composition. By using such molded products, outside plate parts of a vehicle high in heat resistance and impact resistance with compatibility with each other can be formed.

[Test III]

Description will be given of Test III to find out a thermoplastic resin composition, by altering a third component (olefin-based resin (C) and/or a filler (D)) in various ways, in which not only can heat resistance and impact resistance be improved while being almost compatible with each other, but coat adherence can also be improved.

In the embodiment, improvement on coat adherence was more preferably intended in a case where a general melamine-based paint is used as a paint used in coating of outside plate parts of a vehicle such as an automobile, and drying and baking are performed at about 140° C. after coating of the melamine-based paint.

A coat adherence (adhesion strength) was evaluated by performing a coat adherence test according to JIS K 5400 as described above, wherein in a case where a coat separated area is 5% or less, evaluation is good with a symbol o and in a case where a coat separation area exceeds 5%, evaluation is bad with a symbol X.

Note that in Test III, for the purpose to improve electric conductivity of a resin composition, a so-called carbon black is mixed with a proper quantity (for example, 2.5 mass %) as a fourth component. In Test III, an impact resistance was evaluated by means of the IZOD impact test method at ordinary temperature.

<Test III-1>

In Test III-1, specimens for comparative examples in which no third component was mixed were prepared and an impact test, a thermal deformation test and a coat adherence test were performed at ordinary temperature thereon. Test results are shown in FIG. 28.

As understood from the table of FIG. 28, Comparative Examples 51 to 53 use PA9 as a first component (A) and m-EBR as a second component (B) without using a third component. Comparative Example 251 uses PA9 as a first component (A) and m-SEBS as a second component (B) without using a third component.

In any of the comparative examples, coat adherence was evaluated bad (X).

<Test III-2>

Test III-2 used an olefin-based resin component (C) as a third component, which was PP resin with a melting point of 175° C., PE resin with a melting point of 130° C. or m-EVA resin with a melting point of 98° C.

In the table of FIG. 29, there are shown mixing quantities, test results and the like in Test III-2.

The first row group of FIG. 29 used compositions in which PA9T was included as a first component, m-EBR with a content of 20 mass % was included as a second component (B) and PE resin with a melting point of 130° C. lower than a coat baking temperature (140° C.) was included as a third component, wherein Examples 51 to 55 with a content of a third component (C) of 10 mass % or less was able to improve heat resistance and impact resistance while being compatible with each other and besides also obtained good results on coat adherence as compared with Comparative Example 51 in which no third component was mixed.

On the other hand, impact resistance in Comparative Example 60 with a mixing quantity of a third component of 15 mass % was lower as compared with Comparative Example 51 in which no third component was mixed. Heat resistance and impact resistance in Comparative Examples 61 and 62 with contents of third components (C) of 20 and 25 mass % or more, respectively, both are lower and coat adherence of both is bad as compared with Comparative Example 51 in which no third component (C) was mixed.

The second row group and the third row group of FIG. 29 used compositions in which PA9T was included as a first component (A), into which m-EBR was mixed with contents of 15 and 13 mass %, and into which PE resin with a melting point of 130° C. lower than a coat baking temperature was mixed in a content of 5 mass % as a third component, with the results that both characteristics of heat resistance and impact resistance in any of Examples 56 and 57 was able to be improved while being compatible with each other and coat adherence therein was also better while having been compatible with each other as compared with Comparative Examples 52 and 53 in which no third component (C) was mixed.

The fourth row group of FIG. 29 used compositions in which PA9T was included as a first component (A), into which m-EBR was mixed with contents in the range of 10 to 20 mass %, and to which PP resin with a melting point of 175° C. higher than a coat baking temperature was mixed in a content of 5 to 15 mass % as a third component, with the results that both characteristics of heat resistance and impact resistance in any of Examples 60 to 63 with contents of the third component of 10 mass % or less was able to be improved while having been compatible with each other as compared with Comparative Example 51 in which no third component (C) was mixed. However, worse results on coat adherence were obtained.

The fifth row group of FIG. 29 used compositions in which PA9T was included as a first component (A), into which m-EBR was mixed in a content of 20 mass % as a second component, and to which PP resin (Example 75) with a melting point of 175° C. higher than a coat baking temperature or PE resin (Example 76) with a melting point of 130° C. lower than a coat baking temperature was mixed in a content of 5 mass % as a third component, with the results that both characteristics of heat resistance and impact resistance in any of the examples was able to be improved while having been compatible with each other as compared with Comparative Example 51 in which no third component (C) was mixed. Coat adherence in Example 76 in which PE resin with a melting point of 130° C. lower than a coat baking temperature was mixed as a third component is also better.

The sixth row group of FIG. 29 used compositions in which PA9T was used as a first component (A), into which m-EBR was mixed in a content of 20 mass % as a second component, and into which m-EVA resin with a melting point of 98° C. lower than a coat baking temperature was mixed in a content of 5 mass % as a third component, with the results that both characteristics of heat resistance and impact resistance was able to be improved while having been compatible with each other and coat adherence therein was also better as compared with Comparative Example 51 in which no third component (C) was mixed.

The seventh row group of FIG. 29 used compositions in which PA9T was used as a first component (A), into which m-SEBS was mixed in a content of 20 mass % as a second component, and into which PP resin with a melting point of 175° C. higher than a coat baking temperature was mixed in a content of 5 mass % as a third component, with the results that both characteristics of heat resistance and impact resistance was able to be improved while having been compatible with each other but coat adherence therein was worse as compared with Comparative Example 251 in which no third component (C) was mixed.

It was understood from above description that use of an olefin-based resin with a melting point lower than a coat baking temperature is generally more advantageous than use of that with a melting point higher than a coat baking temperature.

<Test III-3>

Test III-3 used a filler component (D) as a third component and calcium carbonate or talc was used as the filler component (D).

In a table of FIG. 30, there are shown mixing quantities of components, test results and the like in test II-3.

As understood from the table of FIG. 30, both characteristics of heat resistance and impact resistance, and besides, coat adherence therein was also better in Examples 600 and 650 into which a prekneaded filler component (D) was mixed was able to be improved while having been compatible with each other as compared with Comparative Example 51 into which no third component was mixed.

Hence, it was found that mixing of a filler component (D) as a third component is advantageous in order to enhance coat adherence.

<Test III-4>

Test III-4 was intended to find out a thermoplastic resin composition that was able to improve not only both characteristics of heat resistance and impact resistance while having been almost compatible with each other, but also coat adherence by altering a third component (olefin-based resin (C) and/or a filler (D)) in various ways and used compositions in which PT9T was included as a polyamide resin component (A), which was a first component (a base material component) and m-EBR was included as an acid modified elastomer, which was a second component, and besides, an olefin-based resin component (C) and/or a filler component (D) with proper particle diameters were both added as a third component to thereby prepare specimens for the examples.

The third components (olefin-based resin (C) and a filler (D)) used in Test III-4 were as follows:

Olefin-based resins (C):
PP resin (with a melting point of 175° C. in Comparative Examples)
PE resin (with a melting point of 130° C. in Examples)
m-EVA resin (with a melting point of 98° C. in Examples)
Fillers (D):
Calcium carbonate
Talc Note that as described above, in order to improve electric conductance, a so-called carbon black was also mixed with a proper content (for example, 2.5 mass %).

In tables of FIGS. 31A and 31B, there are shown mixing quantities of components, test results and the like.

The first row group of FIG. 31A used compositions in which PA9 was included as a first component (A), into which m-EBR was mixed in a content of 15 mass % as a second component, and into which PE resin (C) with a melting point of 130° C. lower than a coat baking temperature was mixed in a content in the range of 2.5 to 12 mass % as a third component, wherein prekneaded calcium carbonate (D) with an average particle diameter of 0.15 μm was mixed in a content in the range of 2.5 to 12 mass %.

In this case, coat adherence was good on all the compositions in which a third component was added. Both characteristics of heat resistance and impact resistance in Examples 901 to 907 in which mixing quantities of PE resin (C) and calcium carbonate (D) were included in the range of 2.5 to 7.5 mass % were both able to be improved while having been compatible with each other as compared with Comparative Example 52 in which no third component was mixed.

On the other hand, impact resistance was improved but heat resistance was lowered in Comparative Example 901 in which mixing quantities of PE resin (C) and calcium carbonate (D) were both with a content of 10 mass % as compared with Comparative Example 52. Both characteristics of heat resistance and impact resistance were lower in Comparative Example 902 in which mixing quantities of PE resin (C) and calcium carbonate (D) were both with a content of 12 mass % as compared with Comparative Example 52.

The second row group of FIG. 31A used compositions in which PA9 was included as a first component (A), into which m-EBR was mixed in a content of 20 mass %, and into which PE resin (C) with a melting point of 130° C. lower than a coat baking temperature is mixed with a content in the range of 2.5 to 12 mass % as a third component, wherein prekneaded calcium carbonate (D) with an average particle diameter of 0.15 μm was mixed in a content in the range of 2.5 to 12 mass %.

In this case as well, coat adherence was good on all the compositions in which a third component was included. Both characteristics of heat resistance and impact resistance in Examples 910 to 913 in which mixing quantities of PE resin (C) and calcium carbonate (D) were both included with a content in the range of 2.5 to 7.5 mass % were able to be improved while having been compatible with each other as compared with Comparative Example 51 in which no third component was mixed.

On the other hand, both characteristics of heat resistance and impact resistance in Comparative Examples 905 and 906 in which mixing quantities of PE resin (C) and calcium carbonate (D) were both with 10 mass % or more were lower as compared with Comparative Example 51.

The third row group of FIG. 31B used compositions in which PA9 was included as a first component (A), into which m-EBR is mixed with a content of 15 mass %, into which PE resin (C) with a melting point of 130° C. lower than a coat baking temperature is mixed in a content 5 mass % as a third component, and into which prekneaded calcium carbonate with an average particle diameter of 0.08 or 0.10 μm is mixed with a content of 2.5 mass %.

In this case as well, coat adherence was good on all the compositions (Examples 920 and 921) in which a third component was included. Both characteristics of heat resistance and impact resistance in the both examples was able to be improved while having been compatible with each other as compared with Comparative Example 52 in which no third component was mixed.

The fourth row group of FIG. 31B uses compositions in which PA9 is included as a first component (A), into which m-EBR is mixed with a content of 20 or 15 mass %, into which PP resin (C) with a melting point of 179° C. higher than a coat baking temperature is mixed in a content 5 mass % as a third component, and into which prekneaded calcium carbonate (D) with an average particle diameter of 0.15 μm is mixed with a content of 5 mass %.

In this case as well, coat adherence was good on all the compositions (Examples 930 and 931) in which a third component was included. Both characteristics of heat resistance and impact resistance in the both examples were able to be improved while having been compatible with each other as compared with Comparative Examples 51 and 52 in which no third component was mixed.

The fifth row group of FIG. 31B used compositions in which PA9 was included as a first component (A), into which m-EBR was mixed in a content of 15 mass % as a second component (B), into which m-EVA resin (C) with a melting point of 98° C. lower than a coat baking temperature was mixed in a content 7.5 mass % as a third component, and into which prekneaded calcium carbonate (D) with an average particle diameter of 0.15 μm was mixed in a content of 2.5 mass %.

In this case as well, coat adherence was good in Example 940 in which a third component was included. Both characteristics of heat resistance and impact resistance in Example 940 were able to be improved while having been compatible with each other as compared with Comparative Example 52 in which no third component was mixed.

The sixth row group of FIG. 31B used compositions in which PA9T was included as a first component (A), into which m-EBR was mixed in a content in the range of 10 to 20 mass % as a second component (B), into which PP resin (C) with a melting point of 175° C. higher than a coat baking temperature was mixed in a content in the range of 3 to 9 mass % as a third component, and into which talc (D) with an average particle diameter was mixed in a content in the range of 2.5 to 20 mass % wherein talc (D) was prepared in two kinds one of which was prekneaded (Examples 930, 931, 940, 950 and 951) and the other of which was not prekneaded (Comparative Examples 907 to 909).

In this case as well, coat adherence was good on all the compositions in which a third component was included except for Comparative Example 907 in which talc (D) was excessively mixed with a content of 20 mass % as a third component. Impact resistance in Comparative Examples 907 to 909 in which talc (D) was mixed without prekneading was greatly worse as compared with Comparative Example 51 in which no third component is mixed. Heat resistance in Comparative Examples 907 and 908 were lowered.

On the other hand, both characteristics of heat resistance and impact resistance in Comparative Examples 950 and 951 in which prekneaded talc (D) was mixed was able to be improved while having been compatible with each other as compared with Comparative Example 52 into which no third component was mixed.

From the above description, not only were both characteristics of heat resistance and impact resistance able to be improved while having been almost compatible with each other, but also coat adherence was able to be also bettered and it is more preferable that thermoplastic resin compositions having improved electric conductance were obtained as combinations shown in Examples 901 to 907, Examples 910 to 913, Examples 920 and 921, Examples 930 and 931, Example 940, Examples 950 and 951.

While in the above embodiment, polyamide 9T (PA9T) and polyamide 6T (PA6T) was able to be preferably used as a polyamide resin component, as a first component (A), nylon 4, 6, 11, 12, 66 and 10, MXD6, polyphthalamide and the like can be used in addition thereto and besides, plural kinds of polyamide resins can also be used.

Acid modified elastomers as a second component (B) that were able to be preferably used included: modified olefin-based copolymers and modified styrene-based copolymers such as modified ethylene-butene copolymer (m-EBR), modified ethylene-propylene copolymer (m-EPR); modified styrene-ethylene-butadiene-styrene terpolymer (m-SEBS) and others.

Note that acid modified elastomer components (B) desirably include: a modified olefin-based copolymer or a modified styrene-based copolymer, and for example an ethylene-propylene copolymer (EPR); an ethylene-butene copolymer (EBR); an ethylene-propylene-diene copolymer (EPDM); a polyethylene oxide copolymer (POR); a styrene-ethylene-butadiene-styrene terpolymer (SEBS) obtained by hydrogenating a styrene-butadiene copolymer; a hydrogenated rubber (SEPS) of a styrene-isoprene copolymer; a hydrogenated rubber (CEBS) of a copolymer of 1,2-butadiene and 1,4-butadiene, which may be used either alone or in combination. Preferable are elastomers acid modified with maleic acid or the like.

Olefin-based resin components, which is a third component (C) that was able to be preferably used included: polypropylene (PP) resin; polyethylene (PE) resin; modified polypropylene (m-PP) resin; modified polyethylene (m-PE) resin; and modified ethylene-vinyl acetate alcohol (m-EVA) resin. Note that the olefin-based resin component (C) include: polymers of aliphatic hydrocarbons such as polyethylene, polypropylene, polybutylene, polybutadiene, ethylene-vinyl alcohol and ethylene-vinyl acetate alcohol and in addition, acid modified polymers thereof.

Filler components, which is a third component (D) that was able to be preferably applied include: calcium carbonate, talc and silica, while in addition thereto, including various natural minerals or synthetic materials such as kaolin, bentonite, montmorillonite, zinc carbonate, walastonite, alumina, magnesium oxide, calcium silicate, sodium aluminate, sodium aluminosilicate, magnesium silicate, glass balloon, zinc oxide and hydrotalsite.

INDUSTRIAL APPLICABILITY

According to the invention, a thermoplastic resin composition and a thermoplastic resin molded product capable of improving both characteristics of heat resistance and impact resistance while being compatible with each other, and the molded product can be effectively used, for example, in outside plate parts such as a fender panel of an automobile.

What is claimed is:

1. A thermoplastic resin composition comprising: 65 to 86.5 mass % by total compositional weight of a polyamide resin component (A), 13 to 25 mass % by the total compositional weight of an acid modified elastomer component (B), 0.5 to 10 mass % by the total compositional weight of an olefin-based resin component (C) and 0.5 to 8 mass % by the total compositional weight of a filler component (D),
   wherein the filler component (D) is in a state of particles and the average particle diameter thereof is in a range of 0.08 to 0.7 μm,
   wherein a dispersion phase of a particle structure that is formed from the acid modified elastomer component (B) serving as a shell phase, and the olefin-based resin component (C) and the filler component (D) serving as a core phase is dispersed in a matrix phase formed from the polyamide resin component (A).

2. The thermoplastic resin composition according to claim 1, wherein the acid modified elastomer component (B) is in a range of 15 to 20 mass % by the total compositional weight.

3. The thermoplastic resin composition according to claim 1, wherein the acid modified elastomer component (B) is a modified olefin-based copolymer or a modified styrene-based copolymer.

4. The thermoplastic resin composition according to claim 3, wherein the acid modified elastomer component (B) is a modified ethylene-butene copolymer, a modified ethylene-propylene copolymer or a modified styrene-ethylene-butadiene-styrene terpolymer.

5. The thermoplastic resin composition according to claim 4, wherein the acid modified elastomer component (B) is the modified ethylene-butene copolymer.

6. The thermoplastic resin composition according to claim 1, wherein the olefin-based resin component (C) is at least one resin selected from the group consisting of polypropylene resin, polyethylene resin, and ethylene-vinyl acetate/alcohol resin.

7. The thermoplastic resin composition according to claim 1, wherein the melting point of the olefin-based resin component (C) is 140° C. or lower.

8. The thermoplastic resin composition according to claim 1, wherein the filler component (D) is selected from the group consisting of calcium carbonate, talc, and silica.

9. The thermoplastic resin composition according to claim 1, wherein the polyamide resin component (A) is polyamide 9T.

10. A thermoplastic resin molded product molded from the thermoplastic resin composition according to claim 1.

11. An outer pane for a vehicle formed from the thermoplastic resin molded product according to claim 10.

* * * * *